(12) United States Patent
King

(10) Patent No.: US 10,157,357 B2
(45) Date of Patent: Dec. 18, 2018

(54) ACTIVE STRATEGY MANAGEMENT PLATFORM

(71) Applicant: Kelvin King, Austin, TX (US)

(72) Inventor: Kelvin King, Austin, TX (US)

( * ) Notice: Subject to any disclaimer, the term of this patent is extended or adjusted under 35 U.S.C. 154(b) by 884 days.

(21) Appl. No.: 14/492,562

(22) Filed: Sep. 22, 2014

(65) Prior Publication Data

US 2015/0088614 A1 Mar. 26, 2015

Related U.S. Application Data

(60) Provisional application No. 61/880,727, filed on Sep. 20, 2013.

(51) Int. Cl.

| | |
|---|---|
| *G06Q 10/00* | (2012.01) |
| *G06Q 10/06* | (2012.01) |
| *G06F 17/30* | (2006.01) |
| *G06Q 10/10* | (2012.01) |
| *H04L 12/24* | (2006.01) |
| *G06Q 50/18* | (2012.01) |

(52) U.S. Cl.
CPC ... *G06Q 10/0637* (2013.01); *G06F 17/30979* (2013.01); *G06F 17/30994* (2013.01); *G06Q 10/0631* (2013.01); *G06Q 10/10* (2013.01); *G06Q 50/18* (2013.01); *H04L 41/04* (2013.01)

(58) Field of Classification Search
None
See application file for complete search history.

(56) References Cited

U.S. PATENT DOCUMENTS

| | | | |
|---|---|---|---|
| 2003/0004766 A1* | 1/2003 | Sandoval | G06Q 10/063 705/7.13 |
| 2003/0106039 A1* | 6/2003 | Rosnow | G06Q 10/06 717/100 |
| 2004/0093244 A1* | 5/2004 | Hatcher | G06Q 10/063 705/7.12 |

(Continued)

OTHER PUBLICATIONS

ISA/US: Int'l Application PCT/US14/56841 entitled "Active Strategy Management Platform"; Int'l Search Report and Written Opinion dated Jan. 9, 2015. (13 pg).

*Primary Examiner* — Gurkanwaljit Singh
(74) *Attorney, Agent, or Firm* — Isidore PLLC

(57) ABSTRACT

A computer-implemented active strategy management platform (ASMP) performs the functions of: receiving ideas from at least one organizational stakeholder; receiving a selection of one or more of the ideas to implement as a strategic plan for a corresponding organization; transforming, via the ASMP, the idea into at least one strategic plan of the corresponding organization; transforming the at least one strategic plan into a plurality of operational execution components that align routine operational activities of the organization with broad strategic intentions; and identifying and outputting operational data related to executing strategic ideas in a manner that improves an ability of the organization to realize transformational business goals. The ASMP also automatically detects, based on the relationships mapped within a relational database, changes in operational execution that will impact strategic outcome achievement, in order to enable an organizational leader to proactively make necessary course corrections to a strategic plan.

16 Claims, 20 Drawing Sheets

(56) References Cited

U.S. PATENT DOCUMENTS

| | | | |
|---|---|---|---|
| 2004/0107125 A1* | 6/2004 | Guheen | G06Q 50/01 |
| | | | 705/319 |
| 2004/0186762 A1* | 9/2004 | Beaven | G06Q 10/0633 |
| | | | 705/7.27 |
| 2006/0047535 A1* | 3/2006 | Fredricksen | G06Q 10/06375 |
| | | | 705/7.37 |
| 2007/0156421 A1* | 7/2007 | Klapper | G06Q 50/205 |
| | | | 434/107 |
| 2007/0265899 A1 | 11/2007 | Angier et al. | |
| 2008/0281651 A1 | 11/2008 | Brennan et al. | |
| 2011/0173035 A1 | 7/2011 | Isomm | |
| 2012/0179991 A1 | 7/2012 | Howes et al. | |

* cited by examiner

ACTIVE STRATEGY MANAGEMENT PLATFORM

The present application claims priority from U.S. Provisional Patent Application No. 61/880,727, filed on Sep. 20, 2013, with the same title and substantive specification.

BACKGROUND

1. Technical Field

The present invention generally relates to computer-implemented systems and processes and, and in particular to computer-implemented business automation processes. Still more particularly, the present invention relates to a computer-implemented method and platform that implements an active management strategy throughout a structured entity.

2. Description of the Related Art

As the pace of business evolution increases, globally integrated enterprises are struggling to find effective ways to align strategy, management, and operational execution in pursuit of transformational business goals. Effective strategic execution requires integration of strategic planning with global production and value delivery processes in a manner that frequently requires a new language for business communication. Effective strategic execution also requires an ability to simultaneously integrate requirements across various combinations of three emerging product categories: corporate performance management, extension of enterprise resource planning (ERP), and services oriented architecture (SOA).

Three approaches are commonly employed by enterprises to improve integration between strategic planning and execution of business transformation: balanced scorecard (BSC), control objectives for information and related technology (COBIT), and information technology infrastructure library (ITIL). These three approaches, among several others, are expensive, ad-hoc, and, more importantly, do not scale at the rate required to support transformation of global enterprises and their ecosystems.

The balanced score card approach uses four standard outcome categories/perspectives. These four categories are Financial, Customer, Internal Business Process, and Learning/Growth. These four categories are too limiting and although they represent concepts common to all companies, these categories do not adequately represent the full range of potential strategic focus areas for an organization. In addition, BSC focuses heavily on quantification of strategic outcomes, but does not provide sufficient guidance to structure elaboration and management of strategic outcomes that are not easily quantifiable.

Recently software applications have begun to integrate strategic planning with strategic execution. However, many current software applications limit their implementation to the four outcome categories including Financial, Customer, Internal Business Process, and Learning/Growth, identified in the original BSC method. Some solutions removed this limitation by allowing organizations to specify outcomes in whatever manner they wish. Nevertheless, even in these cases the software programs are limited to creating software-based dashboards, which cascade the metrics of the balanced scorecard. These current solutions are limited to metric-focused strategic planning tools, project management tools and process automation tools.

SUMMARY

The present disclosure provides a computer implemented method and system for defining, planning, integrating and executing strategic ideas in a manner that improves an organization's ability to realize its transformational business goals.

The present disclosure comprises a technology platform solution delivered over a distributed network, such as the Internet, through a software-as-a-service (SaaS) model. The platform captures ideas from a wide range of organizational stakeholders (e.g. customers, employees, partner firms) and enables organizational leaders to transform relevant ideas into strategic plans. Strategic plans are then transformed into operational execution components (e.g. business process definition, product/service definition) that align an organization's routine operational activities with broad strategic intentions.

The platform includes an Internet-based software application that maps relationships between ideas, strategic business outcomes and operational execution components. These relationship mappings specify which operational components must be established or modified to execute a strategic plan. A relational database server is used to persist these mappings in both dynamic and permanent storage. The relationships mapped within the relational database also enable automatic detection of changes in operational execution that will impact strategic outcome achievement. Automatic detection of strategic impacts enables organizational leaders to proactively make necessary course corrections to a strategic plan.

The platform's integrated model also enables automatic update of progress towards strategic goals across multiple execution components (e.g. assumption validation, project implementation, business process execution). Progress is measured based on a weighting that determines an execution component's relative contribution to a strategic outcome. Strategic outcomes are also weighted based on their relative contribution to an overall strategic plan.

The platform transforms ideas into strategic plans through a multi-step process that begins with an organizational leader identifying which ideas represent a relevant opportunity for business improvement. Relevant ideas are then associated with an opportunity portfolio that undergoes a formal opportunity assessment. The platform then helps organizational leaders model a future state solution around the opportunities selected for further consideration.

The platform enables organizational leaders to decompose a broad future state solution into a strategic plan that articulates a broad future organizational vision as well as detailed set of business outcomes that represent goals the organization must achieve to realize the vision. The business outcomes are then further decomposed into implications that describe how the organization must change to achieve its strategic goals.

Implications are the primary link between strategy and execution. Each implication contained within a strategic plan will be expressed as an execution component (e.g. assumption, initiative, process, metric, product.) These execution components map to specific operational activities required to realize the strategy and are defined in a manner that allows direct integration with external systems. The integration with external systems enables the platform to generate automatic updates in response to operational execution events. The integrated nature of the technology platform provides a clear path to communicate strategic outcomes using expressions commonly understood among business executives while simultaneously transforming the expression of business goals into pragmatic business process and product definition expressions commonly understood by business operations personnel. The structured linkage between strategic outcomes and tangible process and product outcomes ensures that operational personnel can relate to the actions required, but also ensures that management can interpret execution results.

The objects and advantages of the embodiments herein will become readily apparent from the following detailed description taken in conjunction with the accompanying drawings.

BRIEF DESCRIPTIONS OF THE DRAWINGS

DETAILED DESCRIPTION

In the following detailed description, reference is made to the accompanying drawings that form a part hereof, and by which specific embodiments that may be practiced are shown by way of illustration. These embodiments are described in sufficient detail to enable those skilled in the art to practice the embodiments and it is to be understood that logical, mechanical and other changes may be made without departing from the scope of the embodiments. The following detailed description is therefore not to be taken in a limiting sense.

The present disclosure provides a technology platform that enables definition, planning, integration and execution of strategic ideas that improve an organization's products, services and internal business processes. The technology platform captures ideas from individuals and transforms the ideas into strategic plans. The strategic plans are then transformed into executable actions required to realize strategic planning objectives. The platform also monitors execution of the plan to help organizational leaders monitor and adjust the plan as needed to realize strategic objectives. Individuals and organizations can use this strategy management technology platform to transform strategic idea definition to idea realization. The platform enables executives to perform top-down strategic planning while simultaneously allowing their subordinates at all levels of the organization to simultaneously perform bottom-up strategic planning. The integrated nature of the platform links the top-down planning and bottom-up planning to form a comprehensive view of strategic solutions and also provide a tangible way to measure operational progress toward achievement of strategic goals. Implementation of the disclosure involves the recognition that current solutions are not designed to provide an active strategy management platform. The innovation described herein recognizes that there is a need, and addresses that need, for a solution that integrates strategic planning and execution into a single system that enables proactive learning and dynamic strategic responsiveness.

Figure 1:
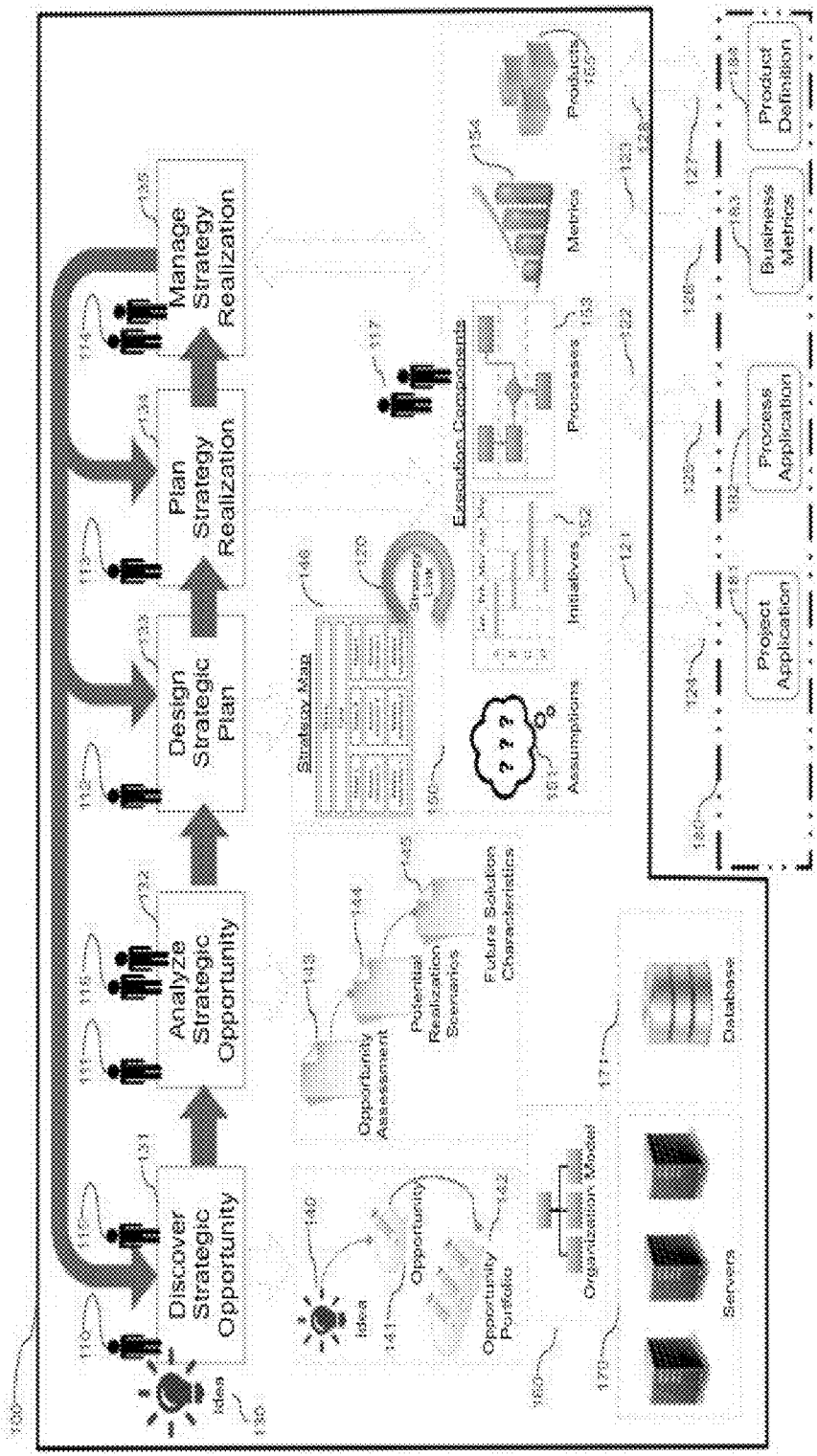
FIG. 1 is a diagram illustrating the end-to-end process flow of the active strategy management platform, according to one or more embodiments.
Figure 20:
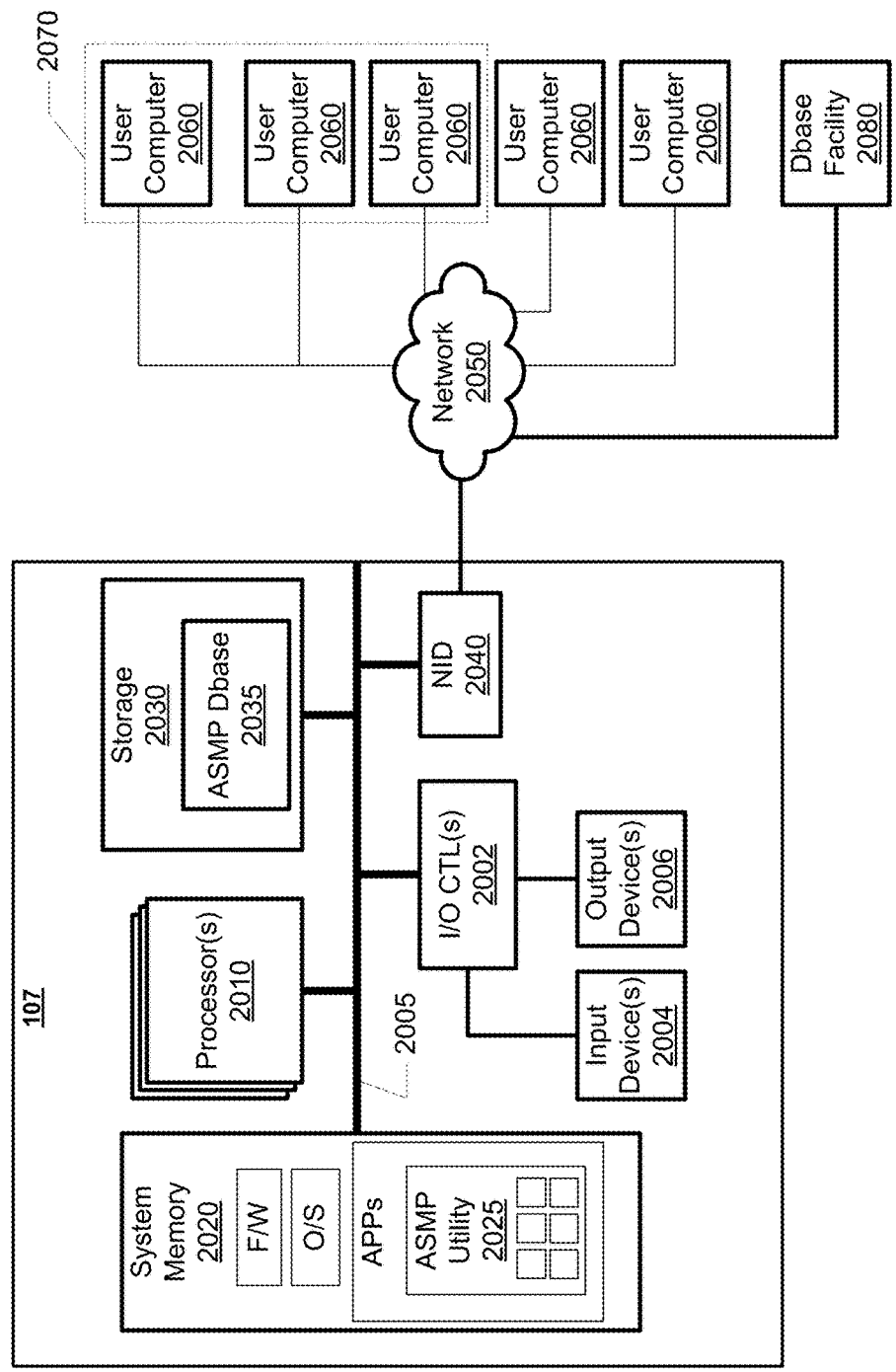
FIG. 20 illustrates aspects of an example data processing system and distributed network within which the various features can be advantageously implemented, in accordance with one or more embodiments.

FIG. 1 shows a process flow for usage of the Active Strategy Management Platform (ASMP) 100. A stakeholder 110 initiates the process by submitting an idea 130. ASMP 100 includes a plurality of executable software modules that can be executed by a processor on a data processing system, such as one of servers 170, with further details illustrated by FIG. 20. Referring to FIG. 20, example data processing system is representative of server 170 and shall be interchangeably referred to as server 170, for consistency. Server 170 includes at least one processor 2010 that is communicatively coupled to a system memory 2020 via a system bus or interconnect 2005. Within system memory 2020 can be a plurality of executable modules, including firmware, and operating system, and applications. As the primary application of relevance to the present disclosure, system memory 2020 contains ASMP utility 2025, which itself includes a plurality of functional modules (generally represented as physical software blocks). ASMP utility 2025 and each of the individual modules contained therein or associated therewith are executable on the at least one processor 2010 to perform various aspects of the disclosure as described herein. Importantly, several of the modules provide an associated user interface (UI) by which external input can be received into the ASMP 100 and relevant details related to the processing being undertaken by the ASMP 100 can be shared with one or more users logged into the ASMP. In at least one embodiment, each user has defined roles and corresponding authorization to access specific portions of the ASMP 100. Also, different user roles and capabilities can be enabled within the ASMP, perhaps based on the a pre-defined hierarchy of users, to allow the different categorization of users to provide different types of inputs and be able to make or recommend different modifications and/or adjustments to or within specific execution modules (via the user interfaces), based on the expressed linkage between the user's login identifier (ID) (utilized to access the ASMP 100) and approved functions and/or roles for that specific user login ID or class of user.

Server 170 includes storage 2030, within which is stored a data structure or database (represented as ASMP Dbase 2035). ASMP Dbase 2035 can contain a plurality of records, each associated with one or more organizations that utilize and/or access the ASMP 100 provided via server 170. Additionally, in one or more alternate embodiments, ASMP Dbase 2035 can be remotely located from server in a separate network accessible storage facility, such as Dbase facility 2080. Server 170 also includes a network interface device 2040 by which server 170 can be communicatively connected, via a distributed network 2050, to one or more second computing devices, such as user computers 2060. As illustrated, several of the user computers 2060 can be affiliated with a single organization (generally represented by the dashed lines 2070). User computers 2060 can also include one or more stakeholder computers by which a corresponding stakeholder communicates the initial ideas in an input portal of the specific organization, which ideas received and recorded by the ASMP for later access by the organizational leader/s. It is appreciated that the term distributed network can be any type of network that enables remote access to server 170 on which the ASMP module 2025 executes and ASMP 1000 is hosted. Local access to server 170 via an administrator, for example, can be supported with the use of input device/s 2004 and/or output device/s 2006 that are connected to processor 2010 via one or more input/output (/O) controllers 2002. Other types of access, including remote access can be supported in alternate embodiments.

Referring again to FIG. 1, "Discover Strategic Opportunity" module 131 is a software module used to persist the idea 140 within a relational database 171. The module 131 creates an opportunity 141 when a stakeholder 110 defines how an idea 140 can be used to improve a company's products, services or internal operations. An opportunity 141 may be linked to a plurality of ideas 140 which provide traceability to the origins of the opportunity 141. A plurality of opportunities may be linked to create an opportunity portfolio 142.

"Analyze Strategic Opportunity" module 132 is a software module that enables strategy owners 111 to analyze the merit of pursuing further development of an opportunity portfolio 142. An opportunity portfolio 142 may contain a single opportunity 141 or a plurality of opportunities 141. The module 132 enables a strategy owner 111 to conduct an opportunity assessment 143 which evaluates the potential impact of pursuing improvements related to a given opportunity portfolio 142. The module 132 then enables a strategy owner 111 to further progress development of an opportunity portfolio 142 by modeling one or more business scenarios 143. Each business scenario 144 models a plurality of future state characteristics 145 that characterize how an organization 160 will be able to operate if the organization 160 can successfully realize the improvements associated with the opportunity portfolio 142. Finally the module 132 enables the strategy owner 111 to specify a final set of future state characteristics 145 that most accurately reflects how the strategy owner desires to operate the organization 160 in the future.

"Design Strategic Plan" module 133 is a software module that enables strategy owners 112 to develop a strategic plan 146 which defines what the organization 160 must accomplish to realize the desired future state characteristics 145.

"Plan Strategy Realization" module 134 is a software module that enables strategy execution managers 113 to define specific execution components 150 required to implement strategic plans 146. A strategic plan 146 may be linked to each or a plurality of execution component categories 151, 152, 153, 154, 155. An assumption component 151 models key hypotheses whose validation or invalidation will have a critical impact on an organization's (160) ability to successfully execute a strategic plan 146. An initiative component 152 models project tasks that must be completed to execute a strategic plan 146. A process component 153 models business processes that are required to execute a strategic plan 146. A metric component 154 models performance objectives that must be achieved to execute a strategic plan 146. A product component 155 models new product capabilities that must be created to execute a strategic plan 146. Operational personnel 117 also participate in refinement of the execution components 150 in collaboration with strategy managers 113. Collectively the strategy design module 133, strategy planning module 134 and strategy realization module 135 help to maintain strategic alignment across all levels of the organization 160.

"Strategy Link" 120 provides bidirectional updates between a strategy map 146 and the map's related execution components 150. The connectivity provided by the strategy link 120 enables strategy owners 112 to track the definition and refinement of execution any execution component 150 associated with a strategic plan 146. The strategy link 120 also enables strategy managers 113 to track refinements to a strategic plan 146 that have been associated with an execution component 150.

"Manage Strategy Realization" 135 is a software module that enables all strategy stakeholders 114 to track execution of the strategic plan 146 by monitoring progress of the related execution components 150. All stakeholders 114 can view and comment on the progress related to any execution component 151, 152, 153, 154, 155 that they are authorized to access. Additionally strategy managers 113 may make refinements to an execution component 151, 152, 153, 154, 155 in an attempt to improve upon the results discovered through the strategy realization module 135. Strategy owners 112 make refinements to strategic plans 146 in an attempt to improve upon the results discovered through the strategy realization module 135.

According to one embodiment, the platform 100 operates via Internet connected servers 170 and stores platform related data in a relational database server 171.

The platform 100 can synchronize the application data 171 with data from external customer environments 180. For example, the platform 100 provides inbound interfaces 121, 122, 123 and 128 which import data from project planning applications 181, process management applications 182, business metric repositories 183 and product definition applications 184 within a customer's internal systems environment 180. The platform also provides outbound interfaces 124, 125, and 126 and 127, which supply data from initiative 152, process 153, measurement 154 and product definition 155 execution components respectively. The data exported from outbound interfaces 124, 125, 126 and 127 can be imported by a customer's project applications 181, process applications 182, business metric repositories 183 and/or product definition application 184 within a customer's internal systems environment 180.

Figure 2:
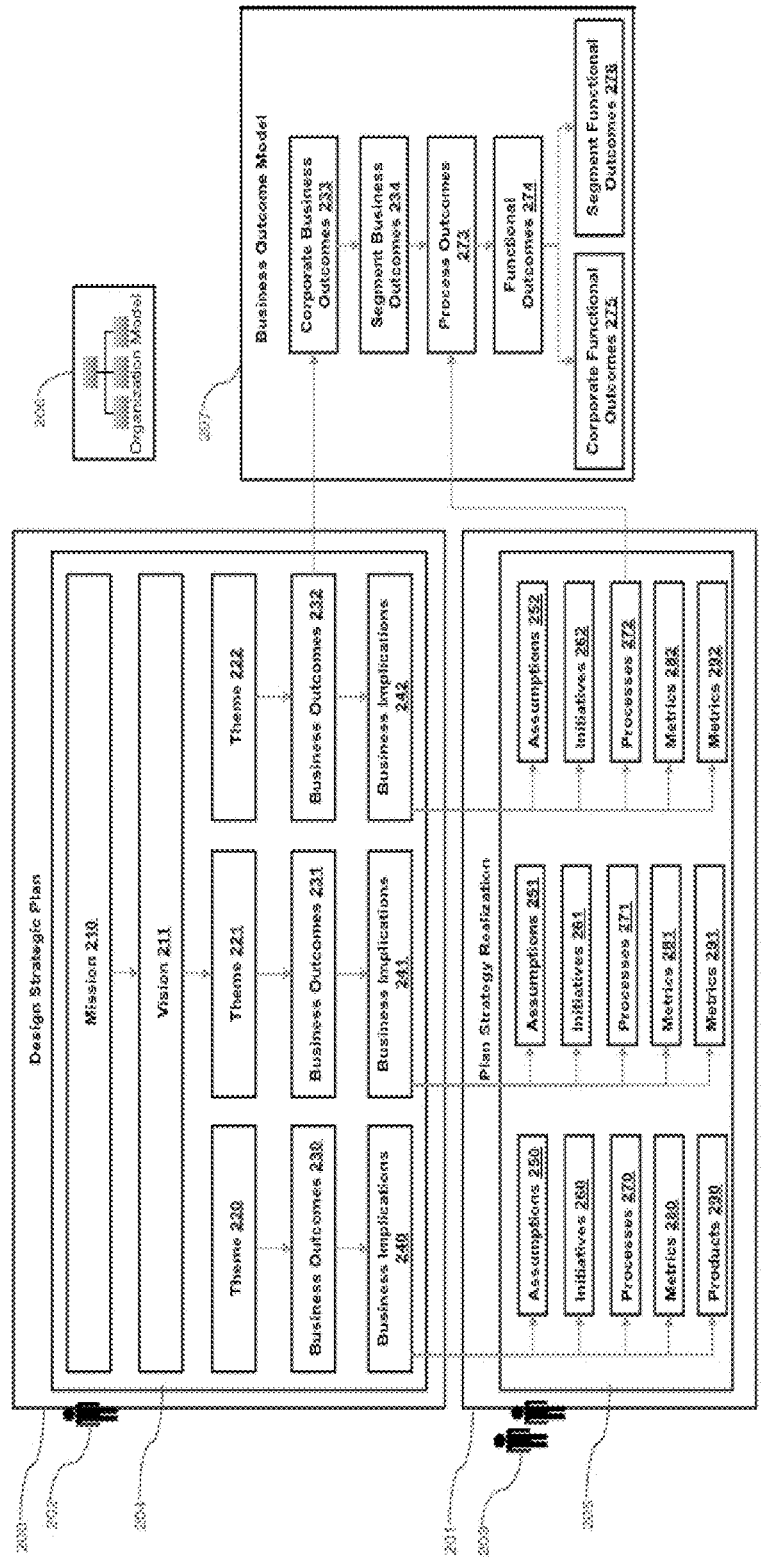
FIG. 2 is a diagram illustrating the development of a sample strategy map and linkage to associated execution components, according to one embodiment.

FIG. 2 is a block diagram of a sample high-level business strategy map 204 linked to a representative set of execution components 205. A strategy owner 202 uses the strategy design module 200 to create a strategic plan 204 including the elements such as mission 210, vision 211, a plurality of target strategic themes 220, 221, 223, a plurality of target strategic outcomes 230, 231, 232, a plurality key business change implications 240, 241, 242, and a plurality of execution components 205 required to address key business change implications 240, 241, 242. The mission 210 is a purpose statement of what the strategy owner 202 would like achieved through the organization 206 from a long-term perspective (typically at least 10 years but often significantly longer). The vision 211 is a more near-term (3 to 5 years) purpose statement focused on the next major achievement the strategy owner 202 would like the organization 206 to accomplish. The target strategic themes 220, 221, 222, 223 identify the major focus areas the organization 206 requires to deliver the vision 211. The plurality of business outcomes 230, 231, 232 decompose each theme 220, 221, 222, 223 respectively into a more detailed set of goals that must be accomplished to deliver the vision 211. The plurality of implications 240, 241, 242 decompose the plurality of outcomes 230, 231, 232 into statements that reflect how the organization 206 must change to achieve to deliver the target business outcomes 230, 231, 232 and ultimately the deliver the vision 211.

The strategy owner 202 uses the strategic plan 204 to collaborate with strategy managers 203 on how the strategic plan 204 will be executed. Strategy managers 203 use the planning module 201 to decompose the plurality of implications 240, 241, 242 into execution components 205. For example, a strategy manager 203 would decompose the plurality of business implications 240 into a plurality of assumptions 250, a plurality of initiatives 260, a plurality of processes 270, a plurality of metrics 280 and a plurality of products 290. Implications 241 would be decomposed into execution components 241, 251, 261, 271 and 281. Implications 242 would be decomposed into execution components 242, 252, 262, 272 and 282. Assumptions 250, 251, 252 are a plurality of critical belief statements that represent conditions required to successfully deliver the overall vision 211 or a specific business outcome 230, 231, 232. If one or more assumptions 250, 251, 252 are proven incorrect then the strategy owner 202 must revise the strategic plan 204 to remove dependence on the relevant assumptions 250, 251, 252. Initiatives 260, 261, 262 are one-time projects that must be completed to deliver the vision 211 or a specific business outcome 230, 231, 232. Processes 270, 271, 272 are ongoing business operational activities/procedures that must be established or modified to deliver the vision 211 or a specific business outcome 230, 231, 232. Metrics 280, 281, 282 are quantifiable measurements of business performance targets and process execution performance targets that must be achieved to deliver the vision 211 or a specific business outcome 230, 231, 232. Products 290, 291, 292 are physical goods and services that must be developed or modified to deliver the vision 211 or a specific business outcome 230, 231, 232.

The business outcome model 207 represents the structural data relationships underpinning a plurality of business outcomes 230, 231, 232. The plurality of outcomes 232 can be categorized into a plurality of corporate outcomes 233, a plurality of segment business outcomes 234, a plurality of process outcomes 273 and a plurality of functional outcomes 274. Functional outcomes 274 can be categorized into a plurality of corporate functional outcomes 275 and a plurality of segment functional outcomes 276.

Corporate business outcomes 233 are tied to the highest level of the organization hierarchy 206 and hence have broadest impact on a strategic plan 204. Segment business outcomes 234 are subordinate to corporate outcomes 233 because segment outcomes 234 are tied to organization 206 levels that are subordinate to the highest level of the corporate organization hierarchy 206. Each process outcome 273 may be linked to a plurality of business processes 272. Each process outcome 273 can be further decomposed into a plurality of functional outcomes 274. Each functional outcome 274 is categorized into either a corporate functional outcome 275 or segment functional outcome 276.

Figure 3:
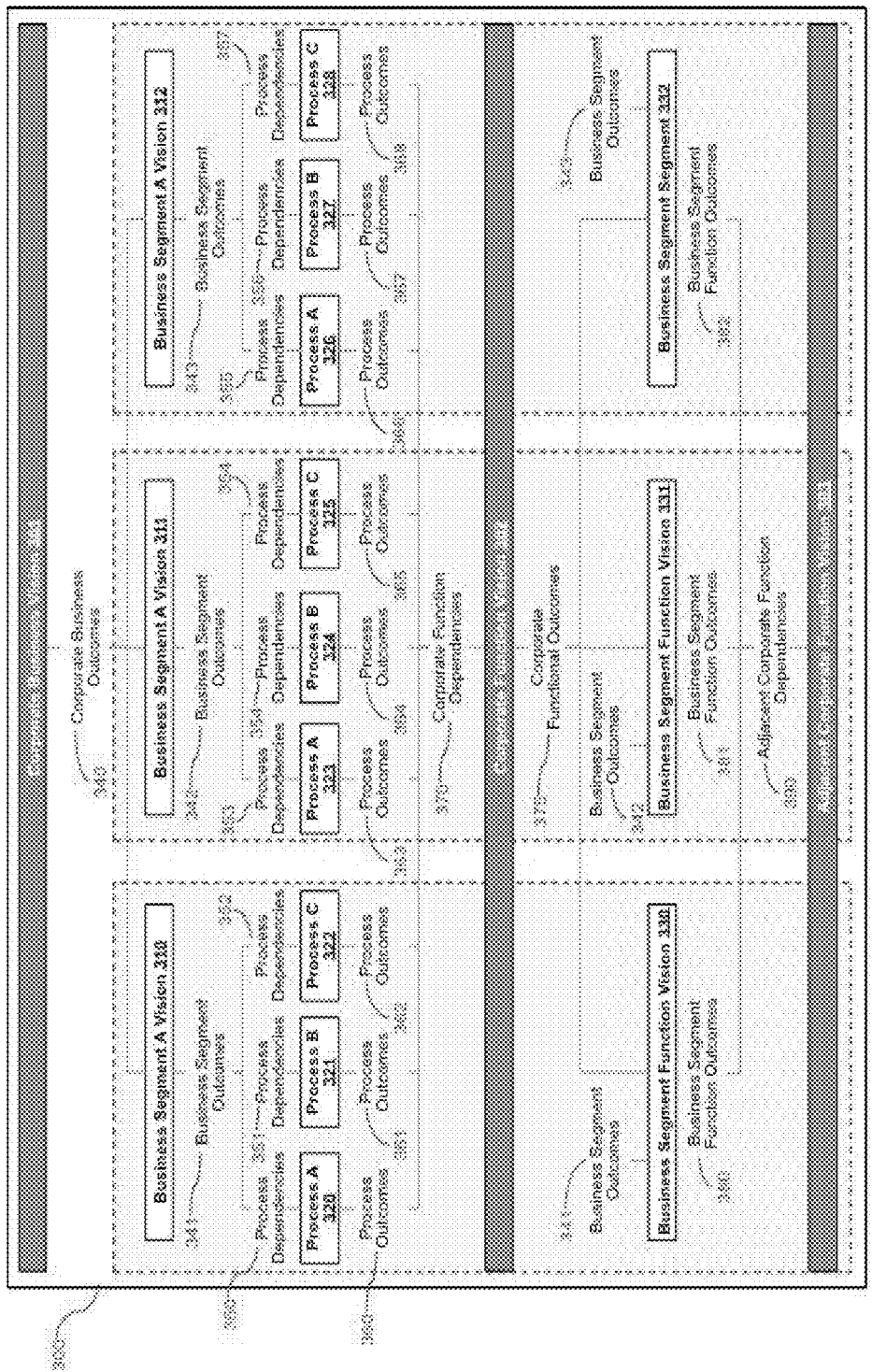
FIG. 3 is a diagram illustrating an integrated view of a strategy map integrated across multiple business/functional units within an organization, according to one embodiment.

FIG. 3 is a block diagram of an expanded strategic outcome model that provides an example of how a corporate level vision 301 is integrated with business segment level vision 310, 311, 312 and functional vision 302, 303 within the platform 100. The organization is composed of a corporate level 301 as well as subordinate organization segments 310, 311, 312, which may represent various product lines and/or geographical divisions. The corporate level 301 also has subordinate level corporate functions 302, 303, which may represent Information Technology, Marketing, Human Resources, Finance, etc. Segment business outcomes 341, 342, 343 directly support segment visions 310, 311, 312 respectively. Process dependencies 350, 351, 352 denote specific business processes 320, 321, 322 respectively that will need to be established or modified to accomplish a plurality of corporate outcomes 340 and a plurality of segment outcomes 341. Each of a plurality of business outcomes 340, 341, 342, 343 may be dependent on multiple business processes 320, 321, 322, 323, 324, 325, 326, 327, 328.

Each process 320, 321, 322, 323, 324, 325, 326, 327, 328 generates a plurality of process outcomes 360, 361, 362, 363, 364, 365, 366, 367, 368. A plurality of corporate function dependencies 370 denotes which process outcomes 360, 361, 362, 363, 364, 365, 366, 367, 368 will require establishment or modification of a functional vision 302 or a plurality of functional outcomes 375. In one embodiment, properly carrying out a functional vision 302 can require inclusion of business segment outcomes and generation of business segment specific visions 330, 331, 332. When a business segment vision 330, 331, 332 is required, then a plurality of business segment specific outcomes 380, 381, 382 will also be defined. Corporate function outcomes 375 and related business segment function outcomes 380, 381, 382 can also create dependency relationships with an adjacent corporate function 390. Each adjacent dependency 390 may then require development of an additional functional vision 303 and a new set of corporate functional outcomes 375 and segment specific functional outcomes to 380, 381, 382 analogous to what is depicted for the corporate function 302.

Figure 4:
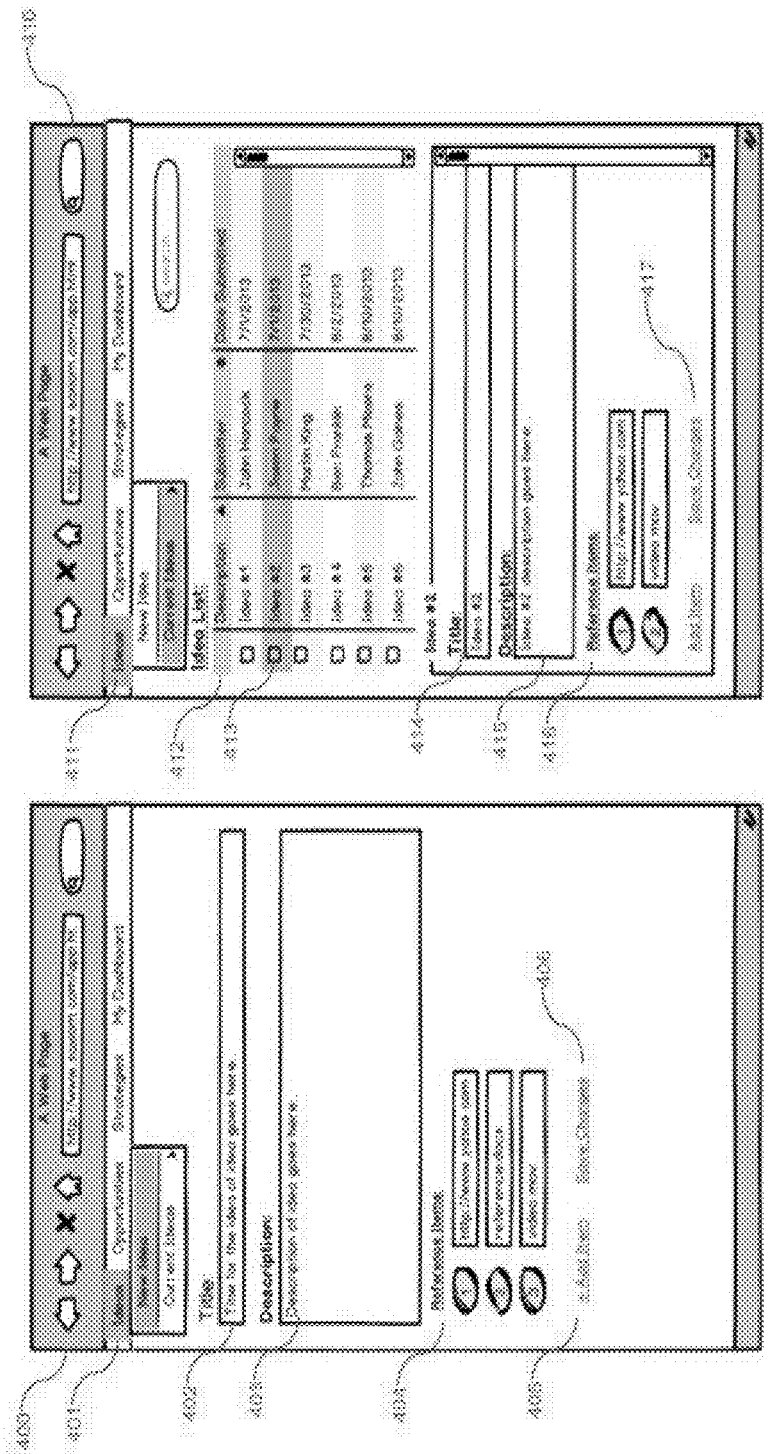
FIG. 4 is a diagram illustrating the user interface for idea creation and idea maintenance, according to one embodiment.

FIG. 4 is a diagram of application screen mockups for idea submission 400 and idea editing 410 within the strategy management platform 100. The menus 401, 411 enable a stakeholder 110 to navigate to an application screen 400 and 410 respectively. Each idea 140 has a title 402 that serves as a short moniker for the idea 140. The description 403 provides one or more paragraphs that describe the idea 140 in more detail. Reference items 404 provide links to external documents e.g. websites, word processor files, videos, etc. that support the detailed description 403. A stakeholder 110 may add more reference items 404 by clicking the add item link 405. Clicking save changes 406, stores the new idea contents 402, 403, 404, within the database 171. Similarly a stakeholder 110 may select the current ideas menu item 411 to see a list of ideas 412 that have been created previously. Selecting a given idea 413 from the list of ideas 412 provides an opportunity to edit the title 414, description 415 or reference items 416 for the selected idea 413. Clicking save changes 417 applies any updates to the idea 413 within the database 171.

Figure 5:
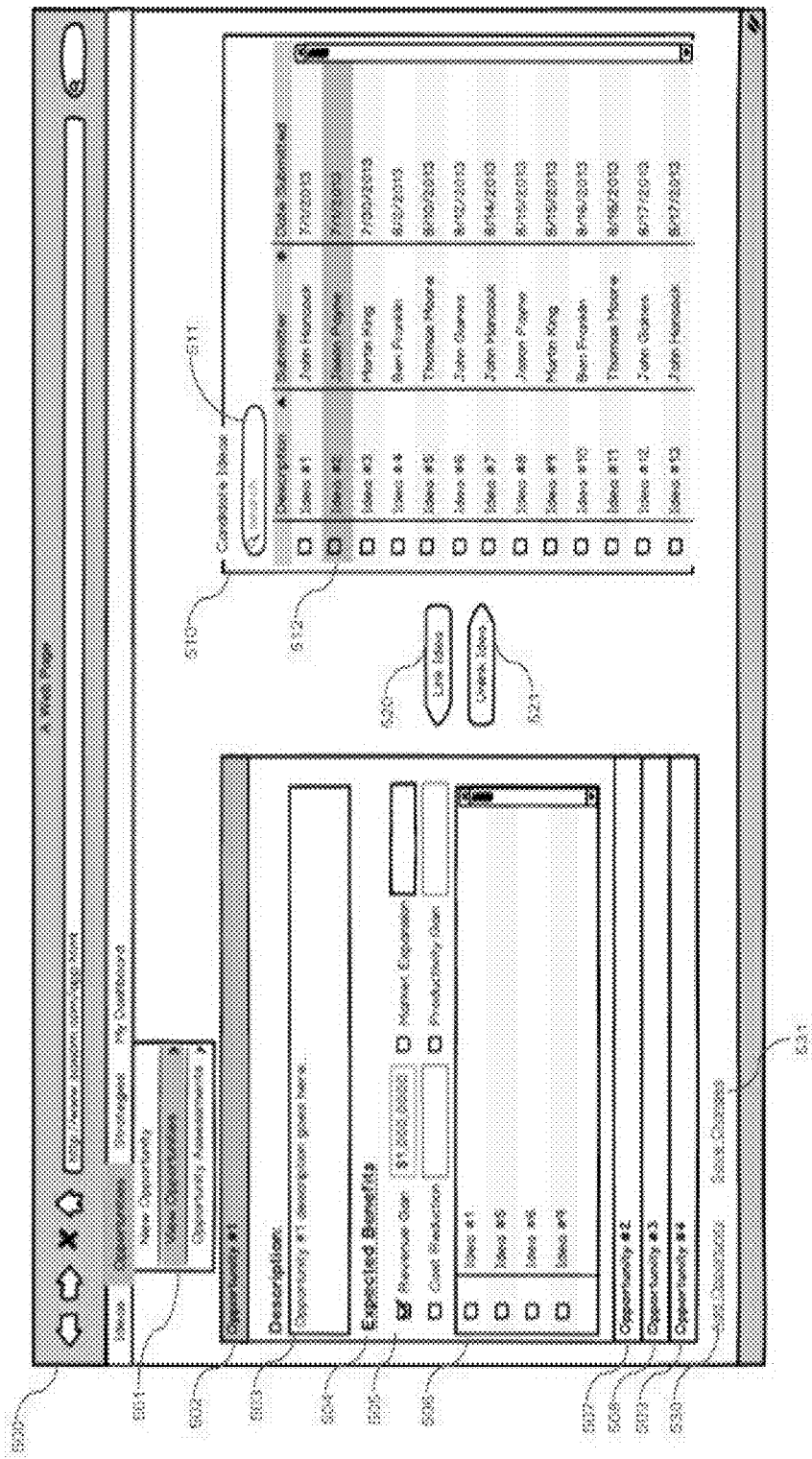
FIG. 5 is a diagram illustrating the user interface for creating opportunities and associating ideas with opportunities, according to one embodiment.

FIG. 5 is a diagram of application screen mockups for opportunity editing 500 within the strategy management platform 100. The menu 501 enables a strategy owner 115 to navigate to the application screen 500. Each opportunity 141 has a title 502 that serves as a short moniker for the opportunity 141. The description 503 provides one or more paragraphs that express details of the opportunity 141. Expected benefits 504 enable the strategy owner 115 to specify what high-level gains e.g. revenue increase, cost reduction, can be achieved by pursuing a given opportunity 502. A checkbox is enabled to allow data entry 505 for the subset of expected benefits 504 that are deemed applicable to the opportunity 502. A plurality of ideas 506 can be associated with each opportunity 502. The screen 500 also enables access to additional opportunities 507, 508, 509. Selecting a different opportunity 507 would display a version of the detailed fields 503, 504, 505, 506 tailored to the selected opportunity 507. This application screen 500 also allows a strategy owner 115 to specify which ideas 506 are related to a given opportunity 502. The strategy owner 115 may select from a list of candidate ideas 510. A strategy owner 115 may filter the list of candidate ideas 510 by entering search criteria 511. A given idea 512 may then be selected and linked to the opportunity 502 by clicking the link button 520. The unlink button 521 can be used to disassociate any of the currently related ideas 506 from an opportunity 502. The add opportunity link 530 can be used to create a new opportunity 141 that will be added to the list of current opportunities 502, 507, 508, 509. Clicking the save changes link 531 stores any changes, created through the application screen 500, within the database 171.

Figure 6:
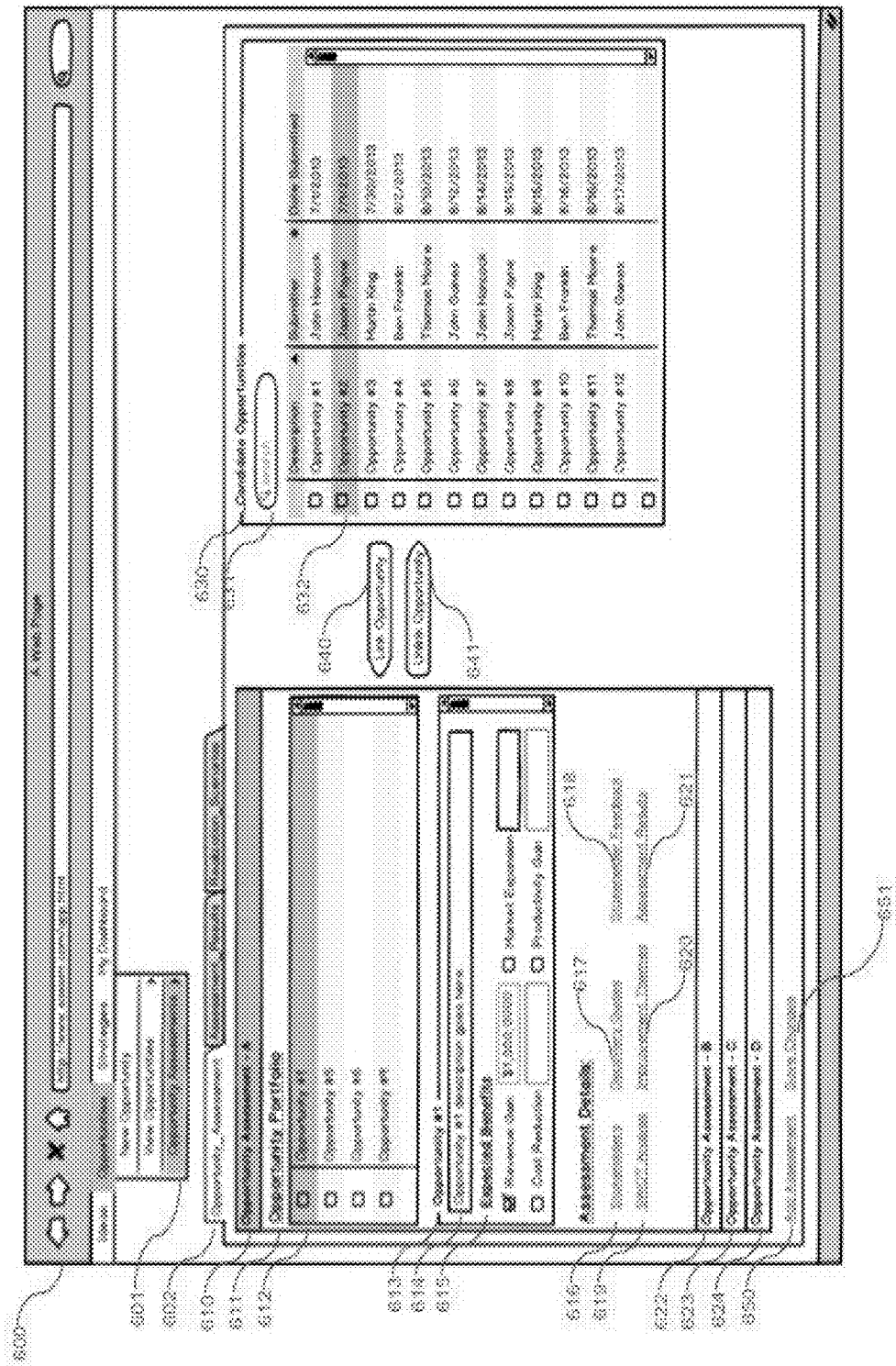
FIG. 6 is a diagram illustrating the user interface for opportunity assessment creation and association of ideas into idea portfolios, according to one embodiment.

FIG. 6 is a diagram of application screen mockups for opportunity assessment summary 600 within the strategy management platform 100. The menu 601 enables a strategy owner 111 to navigate to the application screen 600. The opportunity assessment tab 602 provides access to multiple opportunity assessments 143. A given opportunity assessment 610 contains an opportunity portfolio 611 which can contain a plurality of opportunities 612. Selecting a given opportunity 612 enables the strategy owner 111 to edit the description 614 and expected benefits 615 of that opportunity 613. Each opportunity assessment view 610 also provides access to additional assessment details 616, 617, 618, 619, 620, 621. The stakeholder link 616 navigates to a screen that identifies which stakeholders 116 have contributed feedback into the assessment. The discovery guide link navigates to a screen that summarizes the information gathered from stakeholders 116 when conducting the assessment 610. The stakeholder feedback link 618 navigates to a screen that contains details of feedback gathered from stakeholders 116 during the assessment 610. The SWOT (Strengths, Weaknesses, Opportunities and Threats) link 619 navigates to a screen that details the strengths, weaknesses, opportunities, and threats stakeholders 116 identified during the assessment 610. The improvement themes link 620 navigates to a screen listing specific improvement opportunities identified as a result of performing the assessment 610. The assessment results link 621 navigates to a screen that provides a quantified summary of the results of the assessment 610. A strategy owner 111 may view the content 611, 613, 616, 617, 618, 619, 620, 621 for additional opportunity assessments 143 by clicking on an alternate opportunity assessment 622, 623, or 624. The strategy owner 111 may include additional candidate opportunities 630 to the opportunity portfolio 611 by selecting a given opportunity 632 and clicking link opportunity 640. The strategy owner 111 may remove any opportunities 612 within an opportunity portfolio 611 by clicking unlink opportunity 641. The strategy owner 111 can also use the search box 631 to filter the list of candidate opportunities 630. A new opportunity assessment 143 can be created by clicking add assessment 650. Clicking the save changes link 651 stores any changes, created through the application screen 600 within the database 171.

Figure 7:
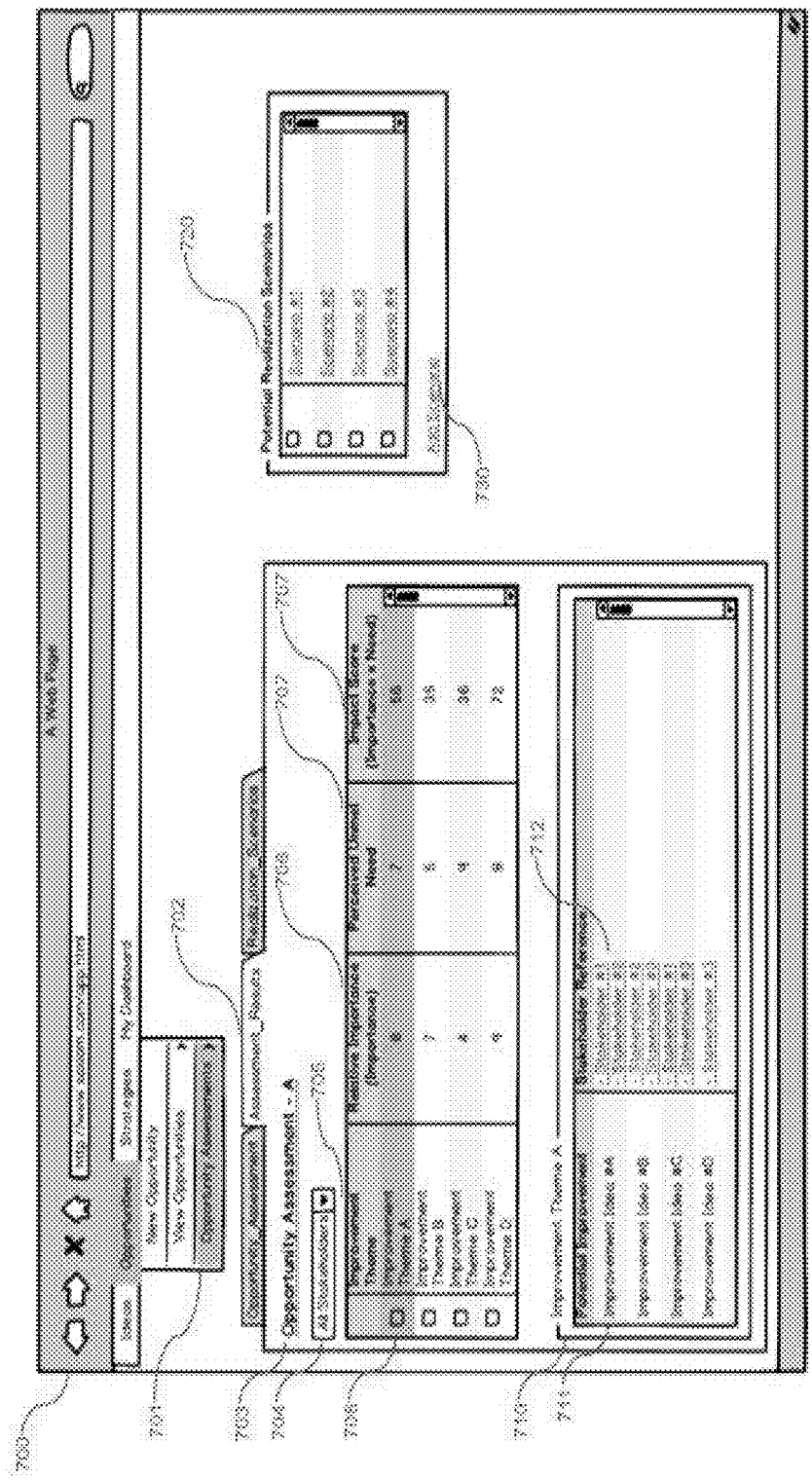
FIG. 7 is a diagram illustrating the user interface for viewing opportunity assessment results and creating potential opportunity realization scenarios, according to one embodiment.

FIG. 7 is a diagram of application screen mockups for opportunity assessment results 700 within the strategy management platform 100. The menu 701 enables a strategy owner 111 to navigate to the application screen 700. The opportunity assessment results tab 702 provides access to the results for a given opportunity assessment 703. The stakeholder selection widget 704 allows the strategy owner 111 to select the assessment results from a specific population of stakeholders 116. The assessment results 702 are based on ratings 706, 707 assigned to improvement themes 705. The importance rating 706 multiplied by the need rating 707 is used to calculate an impact score 707 for each improvement theme 705. A strategy owner 111 may select a specific improvement theme 708 to gain access to the details associated with the improvement theme 710. Each improvement theme 710 may contain a plurality of specific improvement ideas 711. A strategy owner 111 can click a stakeholder link 712 to view details of the feedback provided by a stakeholder 116 that led to the improvement idea 711. A strategy owner 111 can also use this screen 700 to track potential opportunity realization scenarios 720 which describe how the improvement themes 705 may impact the organization 160 in the future. The strategy owner 111 can click add scenario 730 to create additional realization scenarios 720.

Figure 8:
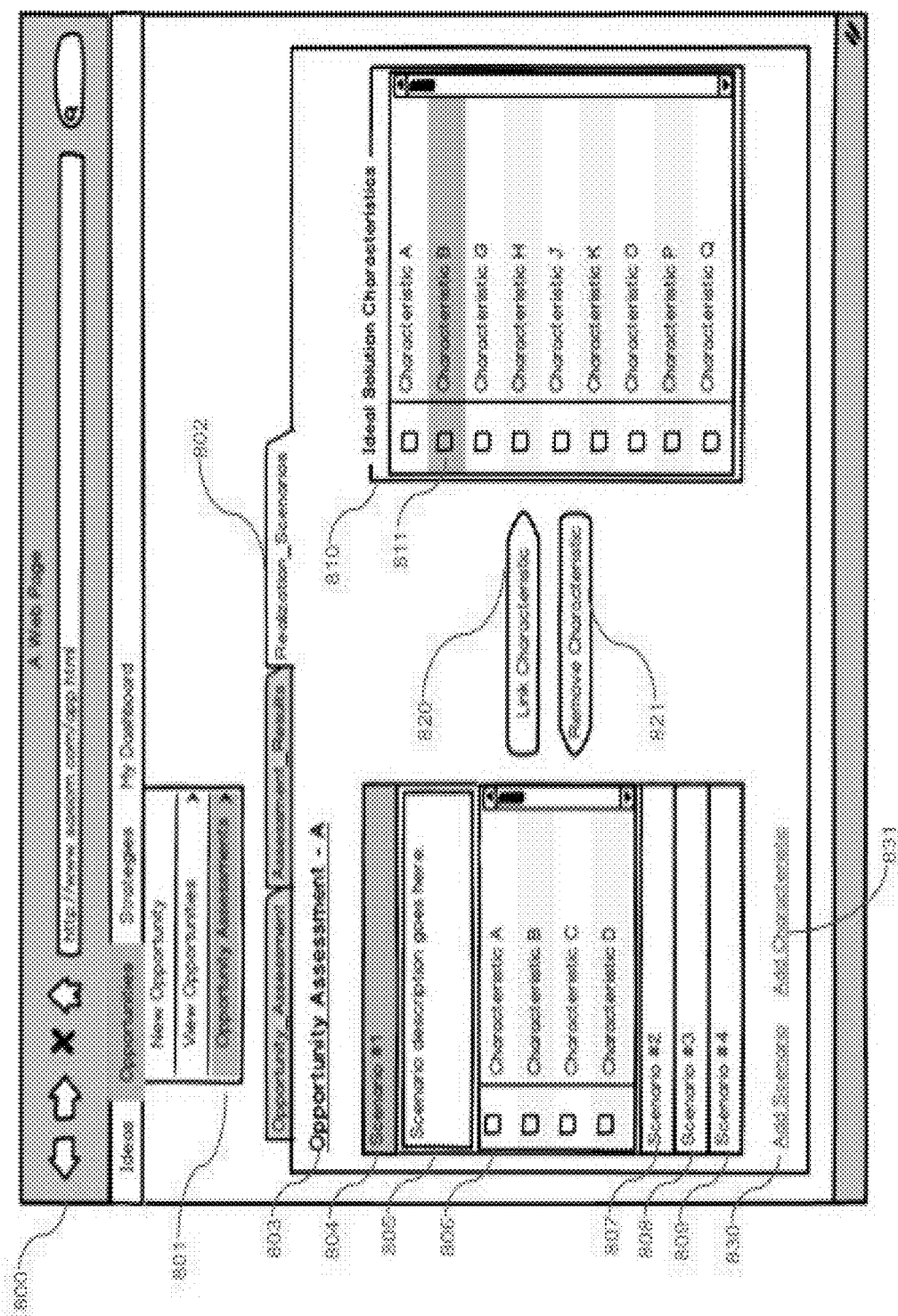
FIG. 8 is a diagram illustrating the user interface for creating and expanding the details of opportunity realization scenarios, according to one embodiment.

FIG. 8 is a diagram of application screen mockups for realization scenarios 800 within the strategy management platform 100. The menu 801 enables a strategy owner 111 to navigate to the application screen 800. The realization scenario tab 802 provides access to details for a plurality of realization scenarios 804, 807, 808, 809 associated with a given opportunity assessment 803. A given realization scenario 804 contains a description 805 which describes a possible future situation that may occur as a result of decisions/actions related to the opportunity assessment 803. The description 805 describes a positive or negative situation affecting one or more areas of the organization 160. The characteristics 806 describe future state organization 160 traits or results that are likely to occur for the organization 160 as an intended or unintended effect caused by occurrence of the situation described (805). A plurality of positive and negative characteristics 805, 806 collectively represents a potential state of the organization 160. A stakeholder may maintain details for a plurality of scenarios 804, 807, 808, 809, with each scenario 804, 807, 808, 809 containing its own instance of the scenario details 805, 806. The strategy owner may also select one or more characteristics 806 from a given scenario 804 to include as characteristics of the ideal solution 810. Each ideal solution characteristic 812 contributes to definition of desired future state results that the organization 160 seeks to achieve through the opportunities 141 associated with the opportunity assessment 803. The strategy owner 111 may select link characteristic 820 to include a scenario characteristic 806 into the pool of ideal solution characteristics 810. Additionally remove characteristic 821 may be selected to remove a characteristic 811 from the pool 810. A new characteristic 145 may be added directly to a scenario 804, 807, 808, 809 or to the ideal characteristic pool 810 by selecting add characteristic 831. The strategy owner 111 may click add scenario 830 to create additional scenarios 804, 807, 808, 809.

Figure 9:
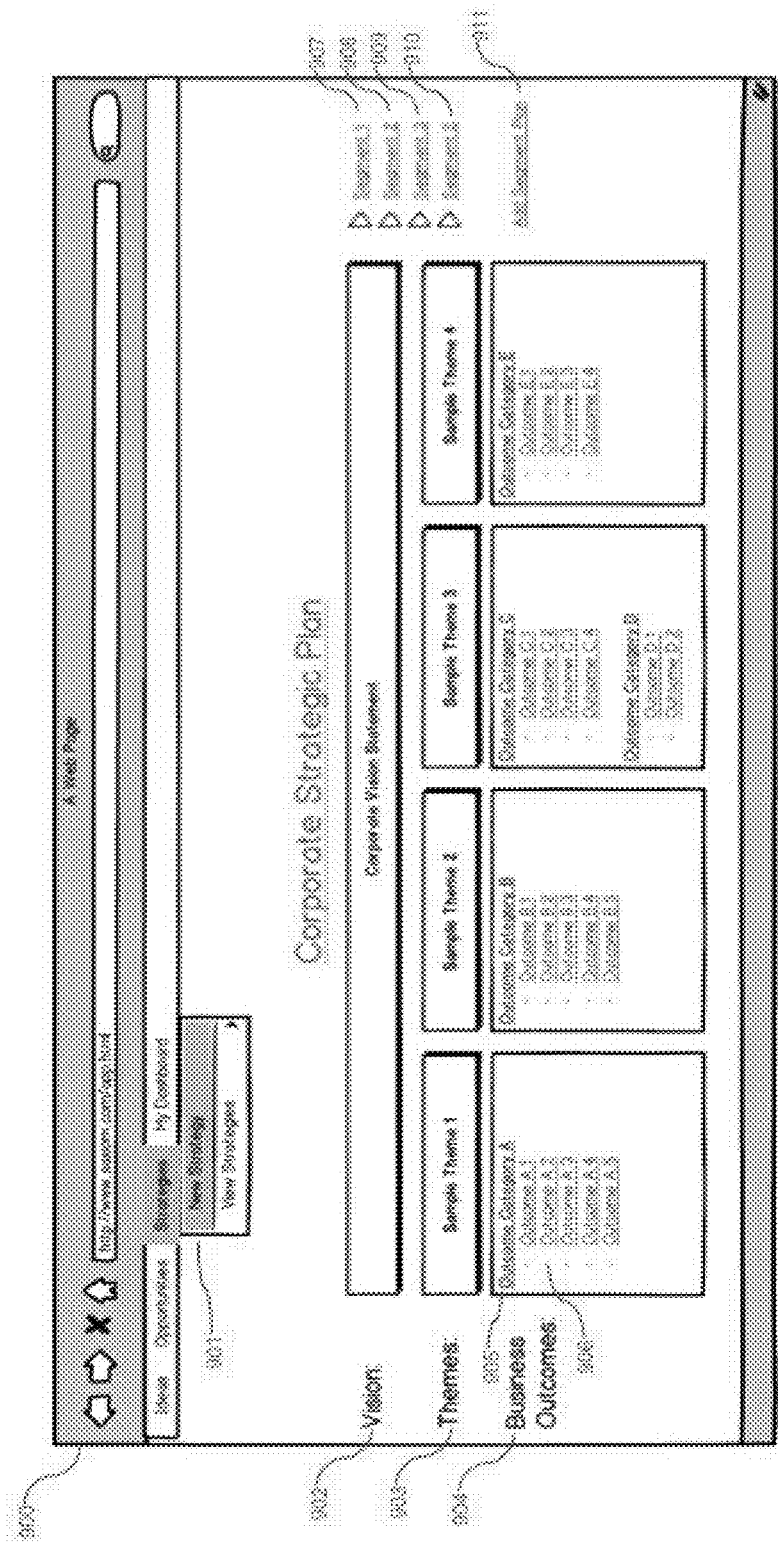
FIG. 9 is a diagram illustrating the user interface for a single page summary of strategic plan or a strategy map, according to one embodiment.

FIG. 9 is a diagram of application screen mockups for a strategy map 900 within the strategy management platform 100. The menu 901 enables a strategy owner 112 to navigate to the application screen 900. The strategy map 900 contains a strategic vision 902, a plurality of strategic themes 903 and a plurality of business outcomes 904. Business outcomes 904 can be organized by an outcome category 905 and detailed outcomes 906. The strategic plan 900 can be cascaded across multiple segments 907, 908, 909, 910, each having a view of the strategic plan 900 tailored to the appropriate organization unit 160. A strategy owner 112 may click add segment plan 911 to create plans 146 for other areas within an organization 160.

Figure 10:
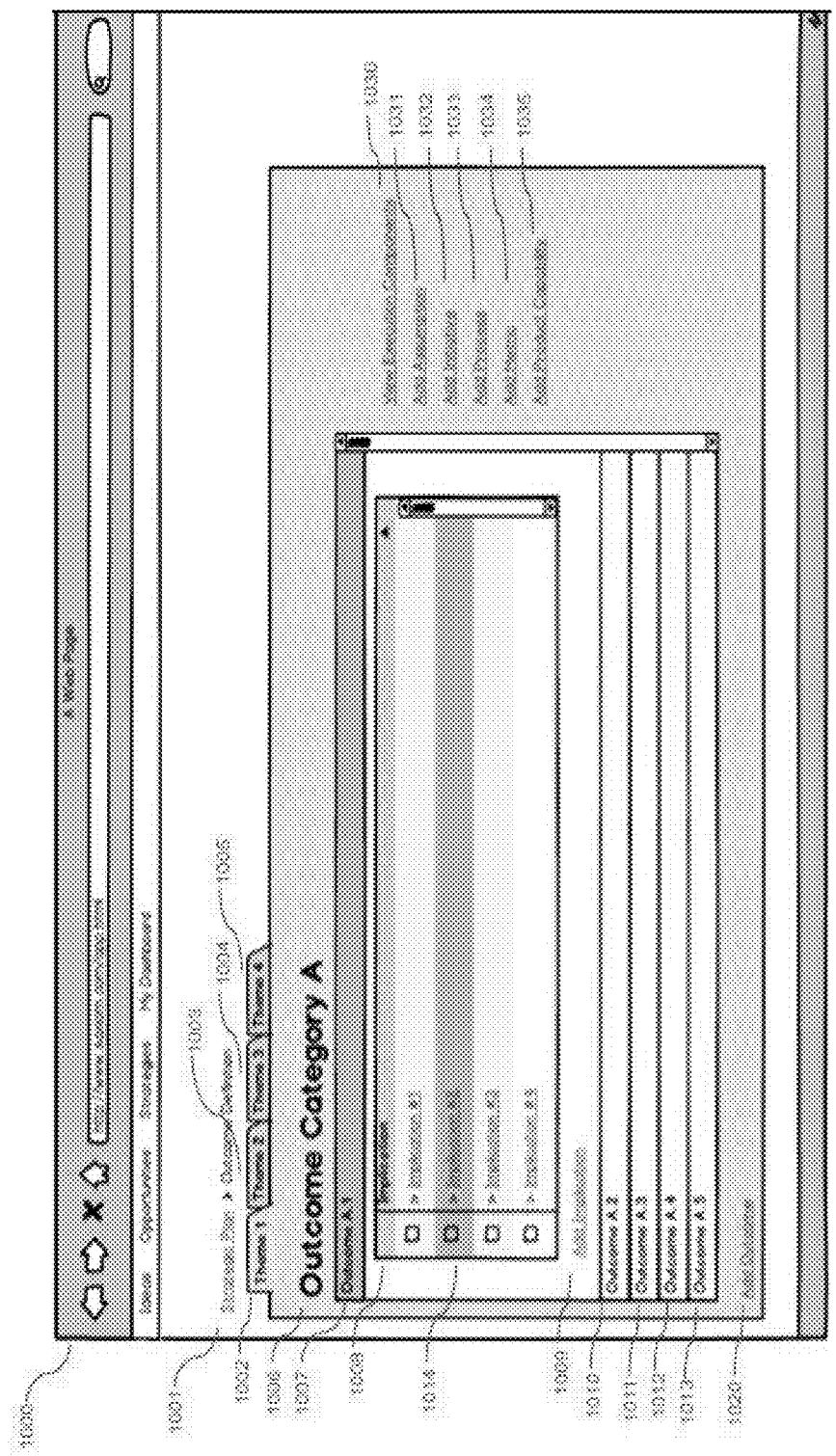
FIG. 10 is a diagram illustrating the user interface for expanding a strategy map to include detailed organizational implications that must be addressed to realize the desired business outcomes, according to one embodiment.

FIG. 10 is a diagram of outcome definition application screen mockups 1000 within the strategy management platform 100. The breadcrumb trail 1001 provides a link back to a specific strategic plan instance 146 associated with the outcome definition model 1000. Outcome details 1006, 1007, 1008, 1010, 1011, 1012, 1013, 1014 can be further defined within each strategic theme 1002, 1003, 1004, 1005 of the strategic plan 146. For each implication 1008, a strategy owner 112 may assign one or more execution components 1030. The strategy owner 112 adds an execution component 1030 by first selecting a specific implication 1014 and then clicking on any of the available execution component types 1031, 1032, 1033, 1034, 1035. Clicking add assumption 1031 will create a linked assumption relationship, as illustrated between implication 240 and assumption 250. Clicking add initiative 1032 will create a linked initiative relationship, as illustrated between implication 240 and initiative 260. Clicking add process 1033 will create a linked process relationship, as illustrated between implication 240 and assumption 270. Clicking add metric 1034 will create a linked metric relationship, as illustrated between implication 240 and assumption 280. Clicking add product 1035 will create a linked product relationship, as illustrated between implication 240 and product 290. A strategy owner 112 can click add outcome 1020 to create a new outcome category 1006 or detailed outcome 1007.

Figure 11:
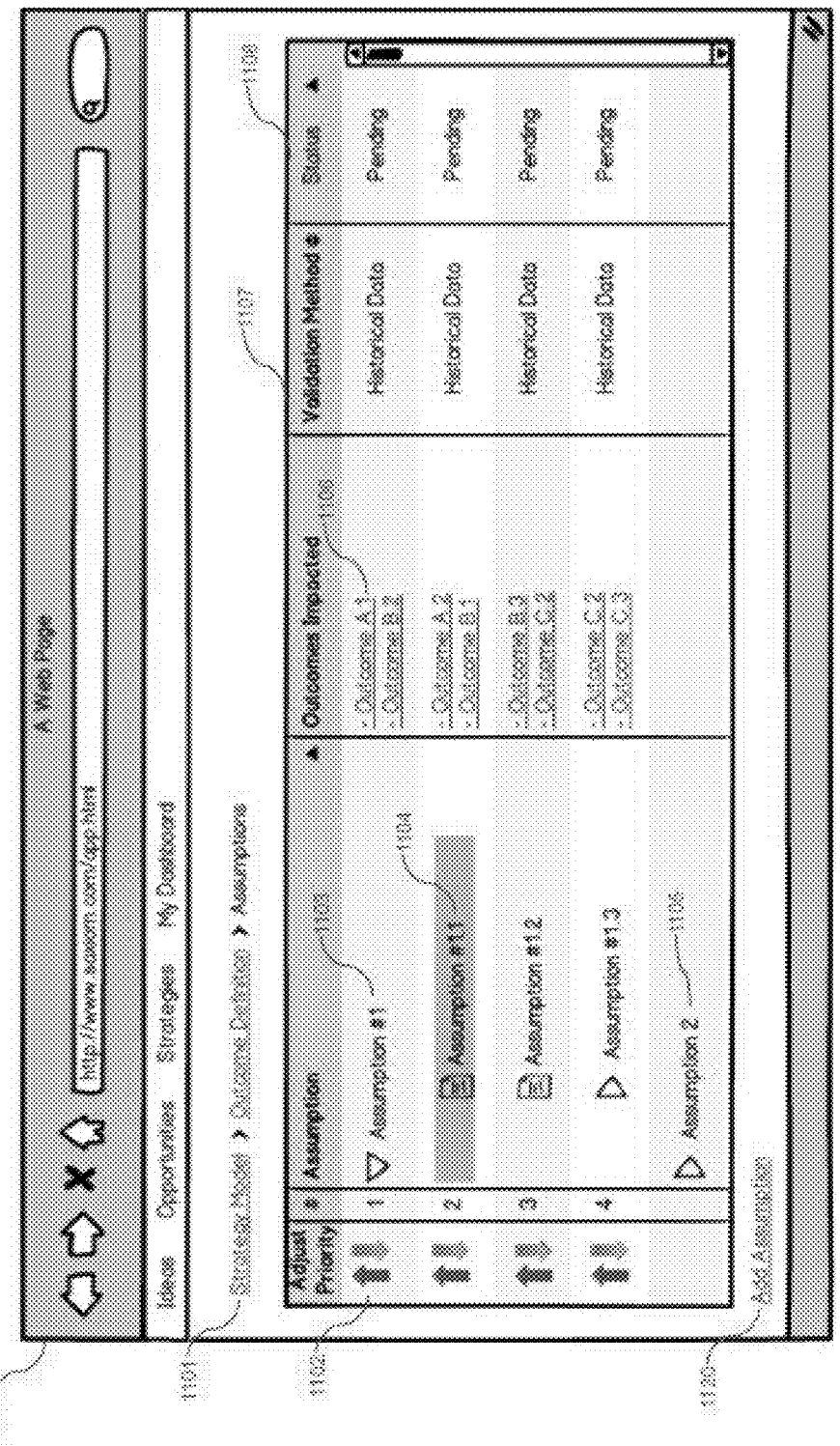
FIG. 11 is a diagram illustrating the user interface for creating strategic assumptions and linking them to strategic outcomes, according to one embodiment.

FIG. 11 is a diagram of the assumption mapping application screen mockup 1100 within the strategy management platform 100. The breadcrumb trail 1101 provides a link back to a specific outcome definition model 1000 for a strategic plan instance 146. The priority arrows 1102 can be used to increase or decrease the relative priority of each assumption 1103, 1105. An assumption 1103 can also be further decomposed into more granular sub-assumptions 1104. Assumptions 1103, 1104, 1105 can also be linked directly to a business outcome 1106. Clicking on the outcome link 1106 will navigate the strategy owner 112 back to the outcome definition view 1000 for the related strategy map 146. The screen 1100 also enables the strategy owner 112 to specify an assumption validation approach 1107 for each assumption 1103, 1104, 1105. Example validation approaches can include the following 1) verification of historical data, 2) market message testing or 3) prototyping. This screen 1100 is also used to track validation status 1108 of each assumption 1103, 1104, 1105. Example validation status values include validated, invalidated, and pending. A strategy owner 112 can click add assumption 1120 to create a new assumption 1103, 1105 or sub-assumption 1104.

Figure 12:
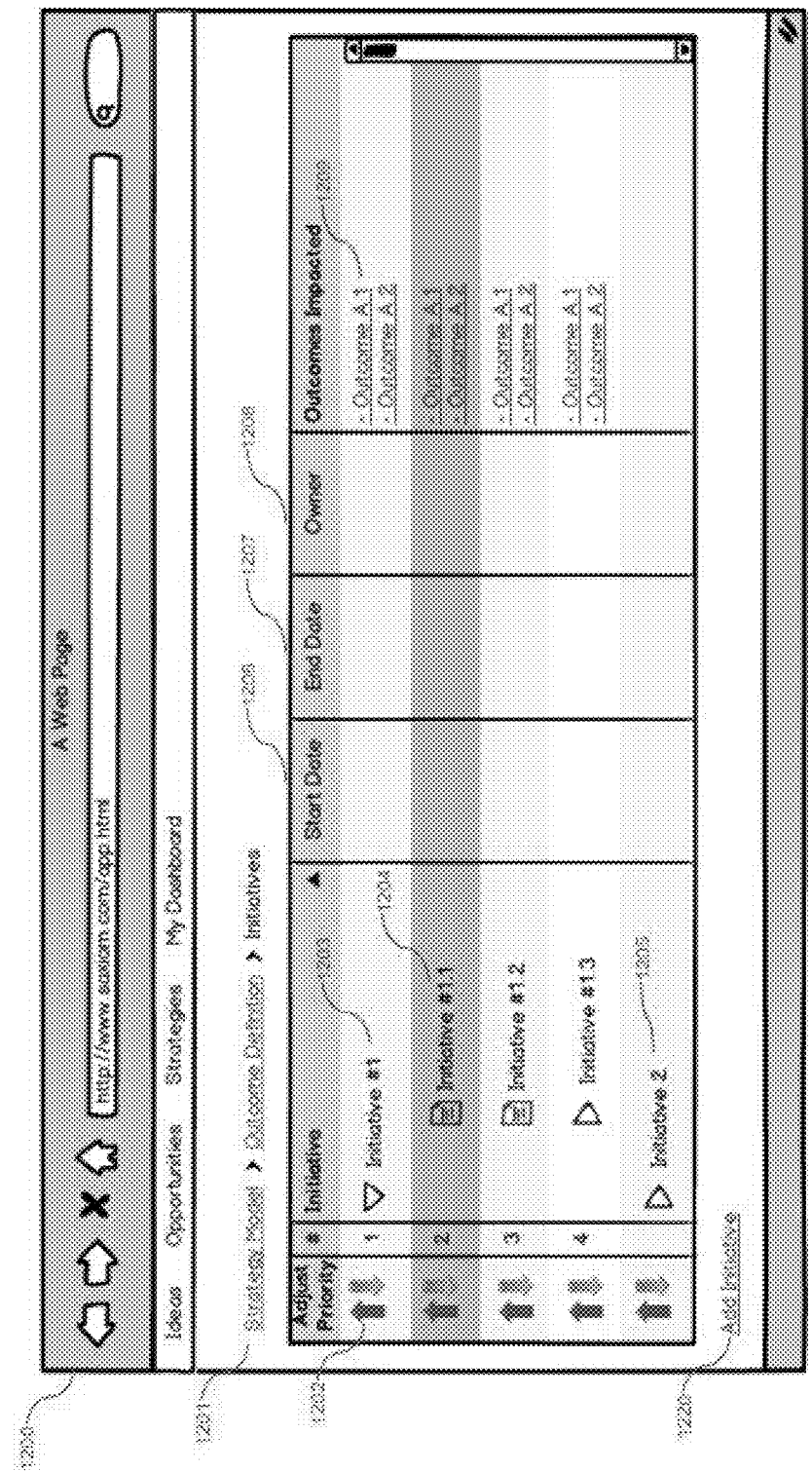
FIG. 12 is a diagram illustrating the user interface for creating strategic initiatives and linking them to strategic outcomes, according to one embodiment.

FIG. 12 is a diagram of the initiative mapping application screen mockup 1200 within the strategy management platform 100. The breadcrumb trail 1201 provides a link back to a specific outcome definition model 1000 for a strategic plan instance 146. The priority arrows 1202 can be used to increase or decrease the relative priority of each initiative 1203, 1204, 1205. An initiative 1203 can also be further decomposed into more granular sub-initiatives 1204. Initiatives 1203, 1204, 1205 can also be linked directly to a business outcome link 1209. Clicking on the outcome link 1209 will navigate the strategy owner 112 back to the outcome definition view 1000 for the related strategy map 146. The screen 1200 also enables the strategy owner 112 to specify a start date 1206, end date 1207, and owner 1208 respectively for each initiative 1203, 1204, 1205. A strategy owner 112 can click add initiative 1220 to create a new assumption 1203, 1205 or sub-assumption 1204.

Figure 13:
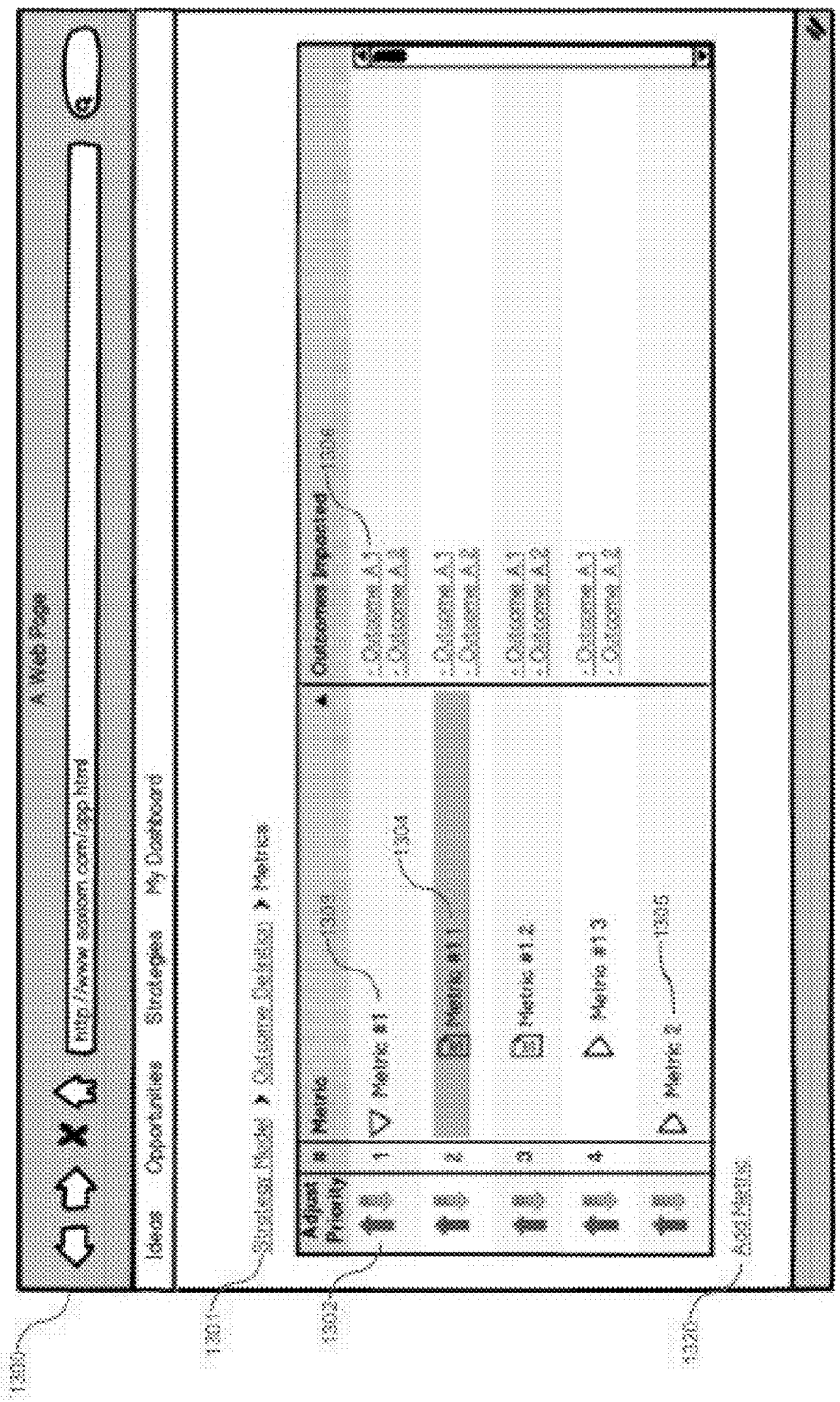
FIG. 13 is a diagram illustrating the user interface for creating strategic metrics and linking them to strategic outcomes, according to one embodiment.

FIG. 13 is a diagram of the metric mapping application screen mockup 1300 within the strategy management platform 100. The breadcrumb trail 1301 provides a link back to a specific outcome definition model 1000 for a strategic plan instance 146. The priority arrows 1302 can be used to increase or decrease the relative priority of each metric 1303, 1304, 1305. A metric 1303 can also be further decomposed into more granular sub-metrics 1304. Metrics 1303, 1304, 1305 can also be linked directly to a business outcome 1306. Clicking on the outcome link 1306 will navigate the strategy owner 112 back to the outcome definition view 1000 for the related strategy map 146. A strategy owner 112 can click add metric 1320 to create a new metric 1303, 1305 or sub-metric 1304.

Figure 14:
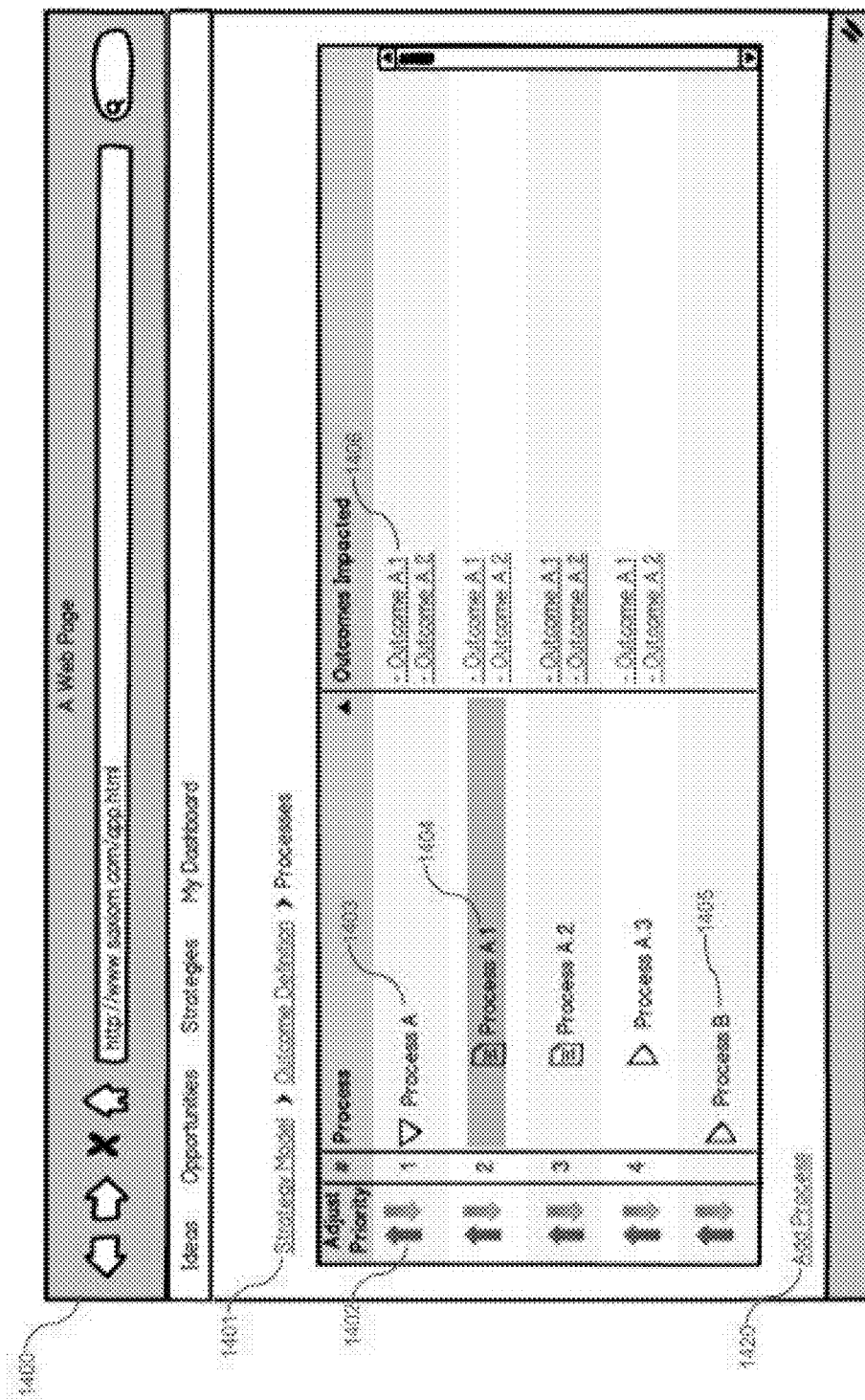
FIG. 14 is a diagram illustrating the user interface for creating strategic business processes and linking them to strategic outcomes, according to one embodiment.

FIG. 14 is a diagram of the process linkage application screen mockup 1400 within the strategy management platform 100. The breadcrumb trail 1401 provides a link back to a specific outcome definition model 1000 for a strategic plan instance 146. The priority arrows 1402 can be used to increase or decrease the relative priority of each process 1403, 1404, 1405. A process 1403 can also be further decomposed into a more granular sub-process 1404. Processes 1403, 1404, 1405 can be linked directly to a business outcome 1406. Clicking on the outcome link 1406 will navigate the strategy owner 112 back to the outcome definition view 1000 for the related strategy map 146. A strategy owner 112 can click add process 1420 to create a new process 1403 or sub-process 1404.

Figure 15:
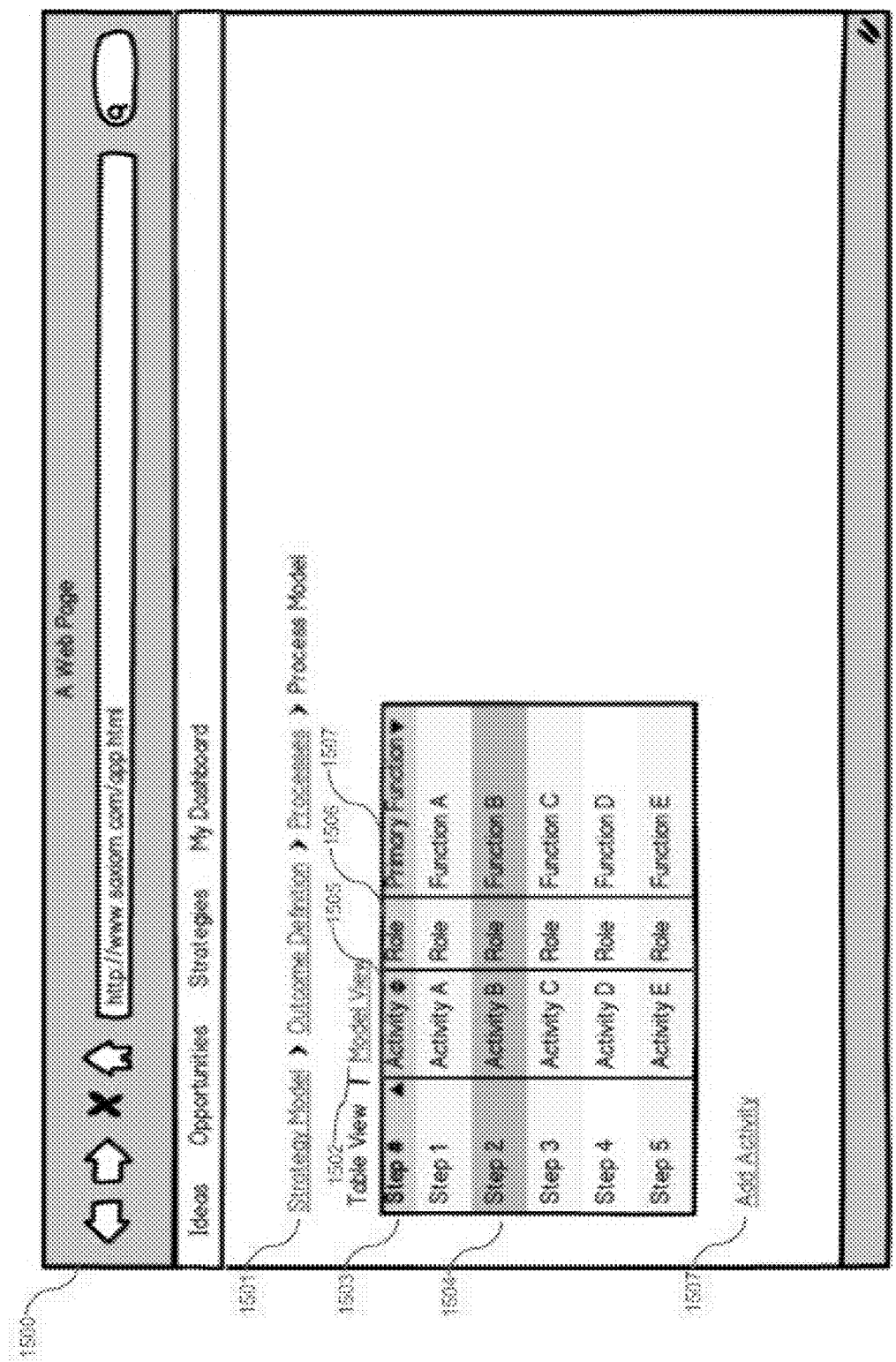
FIG. 15 is a diagram illustrating the user interface for modeling details associated business processes using a table-based view, according to one embodiment.

FIG. 15 is a diagram of the process table view application screen mockup 1500 within the strategy management platform 100. The breadcrumb trail 1501 provides a link back to a specific business process 1404 that has been associated with a specific the outcome definition model 1000 for a strategic plan instance 146. The navigation link 1502 enables a strategy owner 112 to switch to a model view 1600. The process model 1503 is composed of a plurality of process steps 1504. Each step 1504 is associated with a discrete activity 1505. Each activity 1505 may be assigned to one or more roles 1506 within an organization 160. Each activity 1505 may also be associated with a primary functional group 1507 within an organization 160. A single role 1506 may be associated with a plurality of functional groups 1507. A strategy owner 112 can click add activity 1520 to create a new step 1504 within a process 1503.

Figure 16:
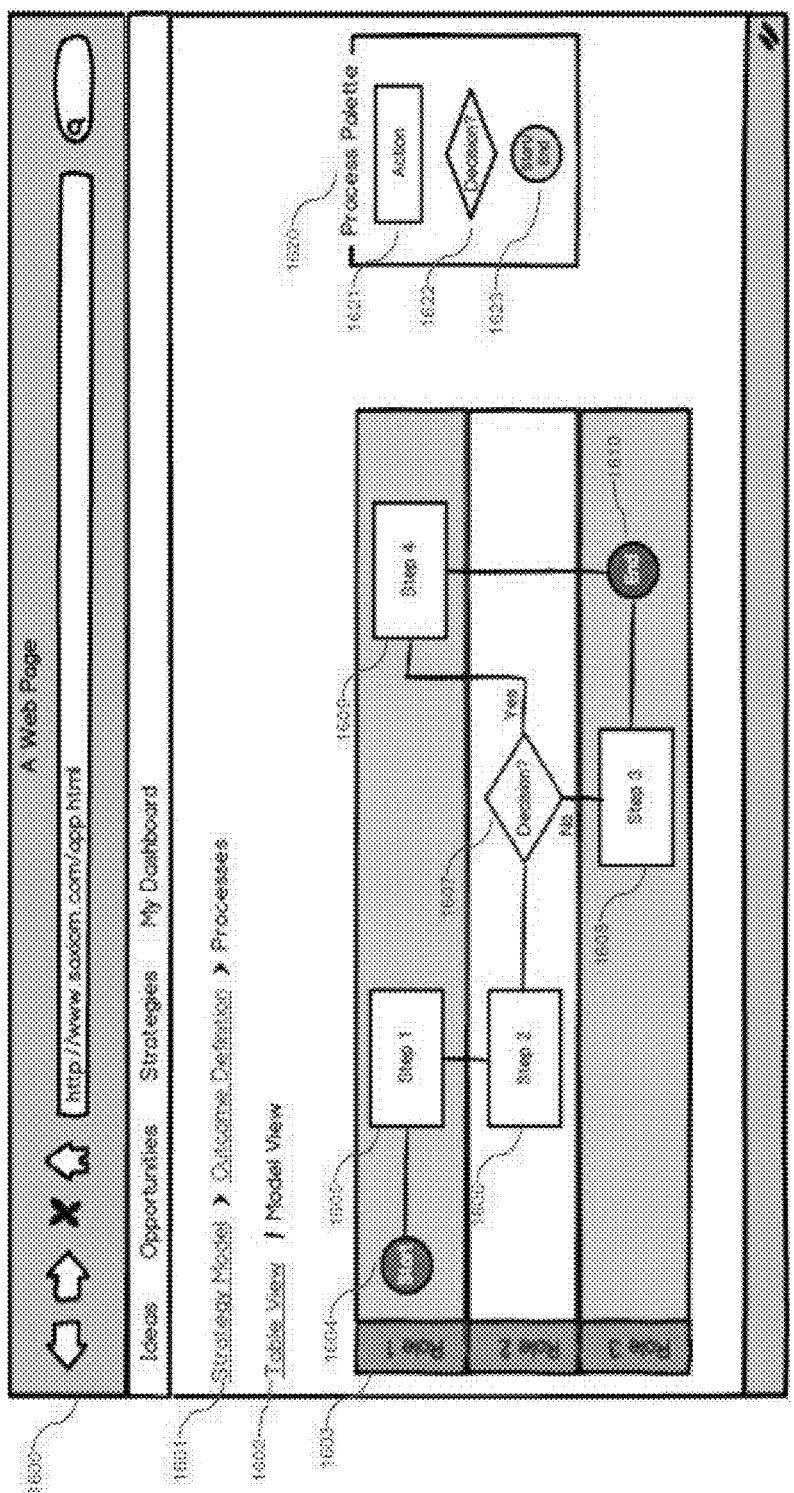
FIG. 16 is a diagram illustrating the user interface for modeling details associated business processes using a diagram-based view, according to one embodiment.

FIG. 16 is a diagram of the process model view application screen mockup 1600 within the strategy management platform 100. The breadcrumb trail 1601 provides a link back to a specific business process 1404 that has been associated with a specific the outcome definition model 1000 for a strategic plan instance 146. The navigation link 1602 enables a strategy owner 112 to switch to a table view 1500. The process model 1603 is composed of a plurality of process steps 1605, 1606, 1608, 1609 and may also include decisions 1607, a start node 1604 and stop node 1610. A strategy owner 112 may drag objects 1621, 1622, 1623 from the process palette 1620. Adding an action object 1621 creates a new process step 1605, 1606, 1608, 1609 in the process model 1603. Adding a decision object 1622 creates a new decision object 1607 in the process model 1603. When a start/end object 1623 is added to the process model 1603, the strategy owner is given the option of whether to create a start object 1604 or an end object 1610.

Figure 17:
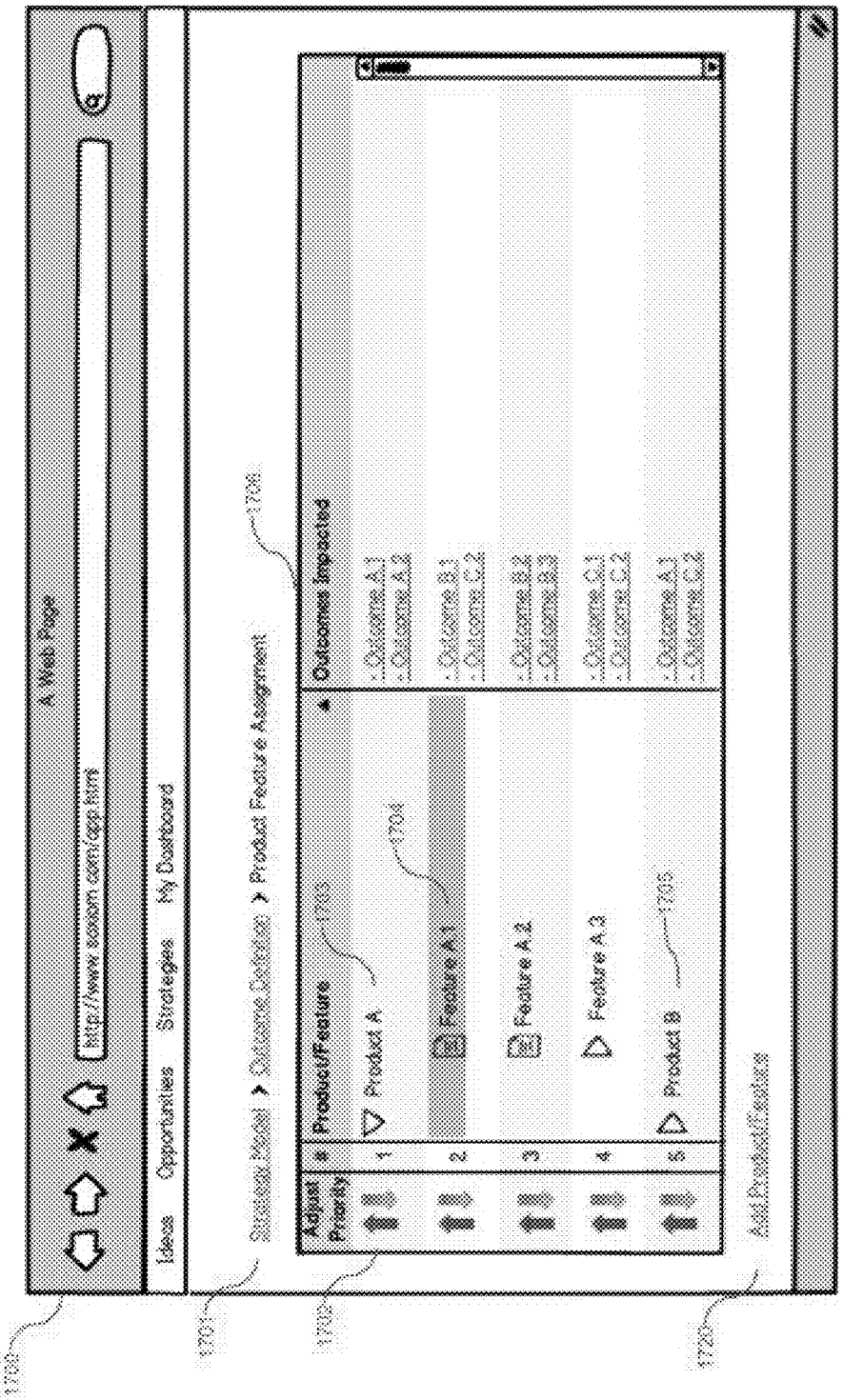
FIG. 17 is a diagram illustrating the user interface for creating product features and linking them to strategic outcomes, according to one embodiment.

FIG. 17 is a diagram of the product linkage application screen mockup 1700 within the strategy management platform 100. The breadcrumb trail 1701 provides a link back to a specific outcome definition model 1000 for a strategic plan instance 146. The priority arrows 1702 can be used to increase or decrease the relative priority of each product/feature 1703, 1704, 1705. A product 1703 can be further decomposed into more granular features 1704. Products/features 1703, 1704, 1705 can also be linked directly to a business outcome 1706. Clicking on the outcome link 1706 will navigate the strategy owner 112 back to the outcome definition view 1000 for the related strategy map 146. A strategy owner 112 can click add product/feature 1720 to create a new product 1703 or feature 1704.

Figure 18:
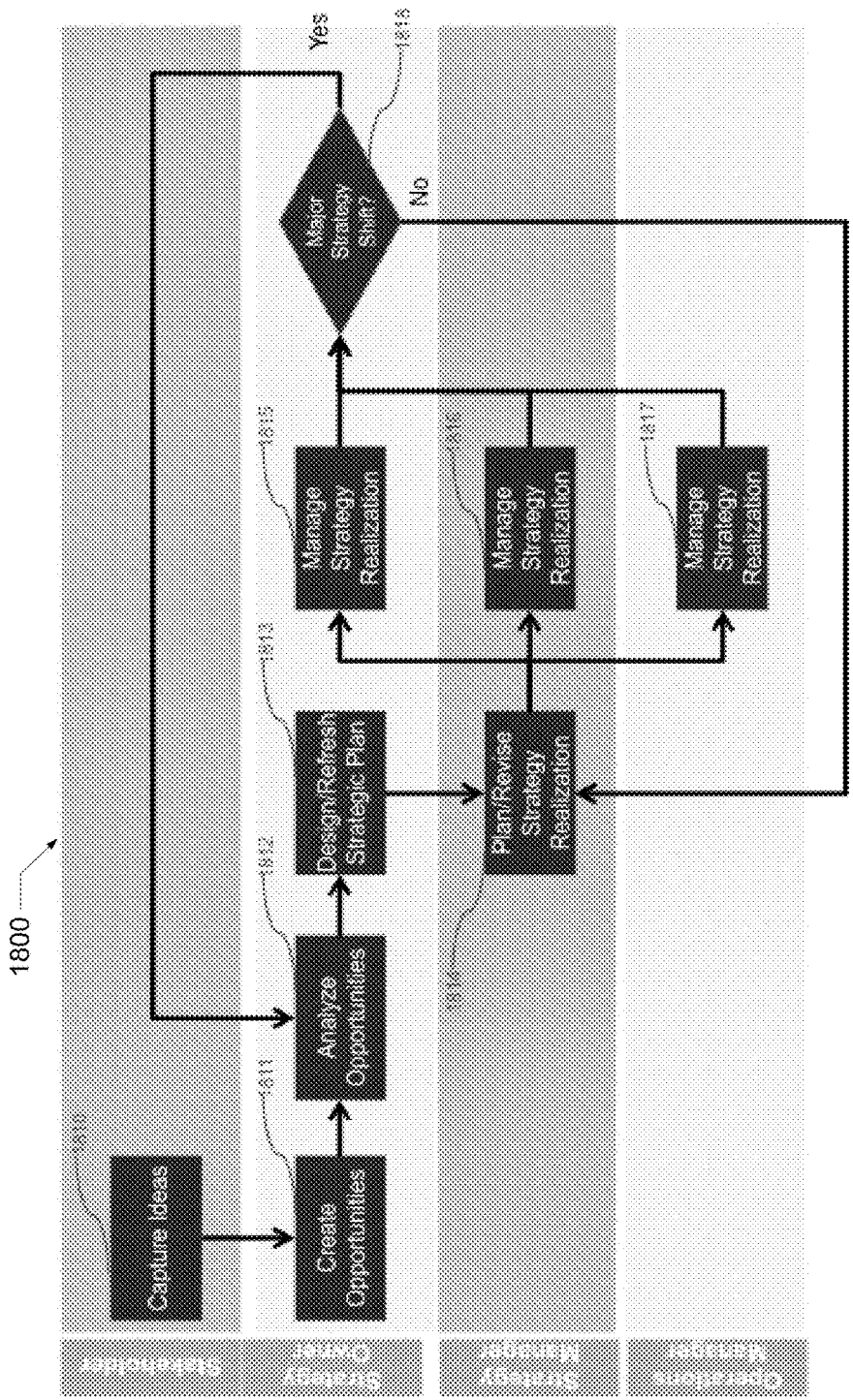
FIG. 18 is a diagram illustrating the process flow for the active strategy management platform, according to one or more embodiments.
Figure 19:
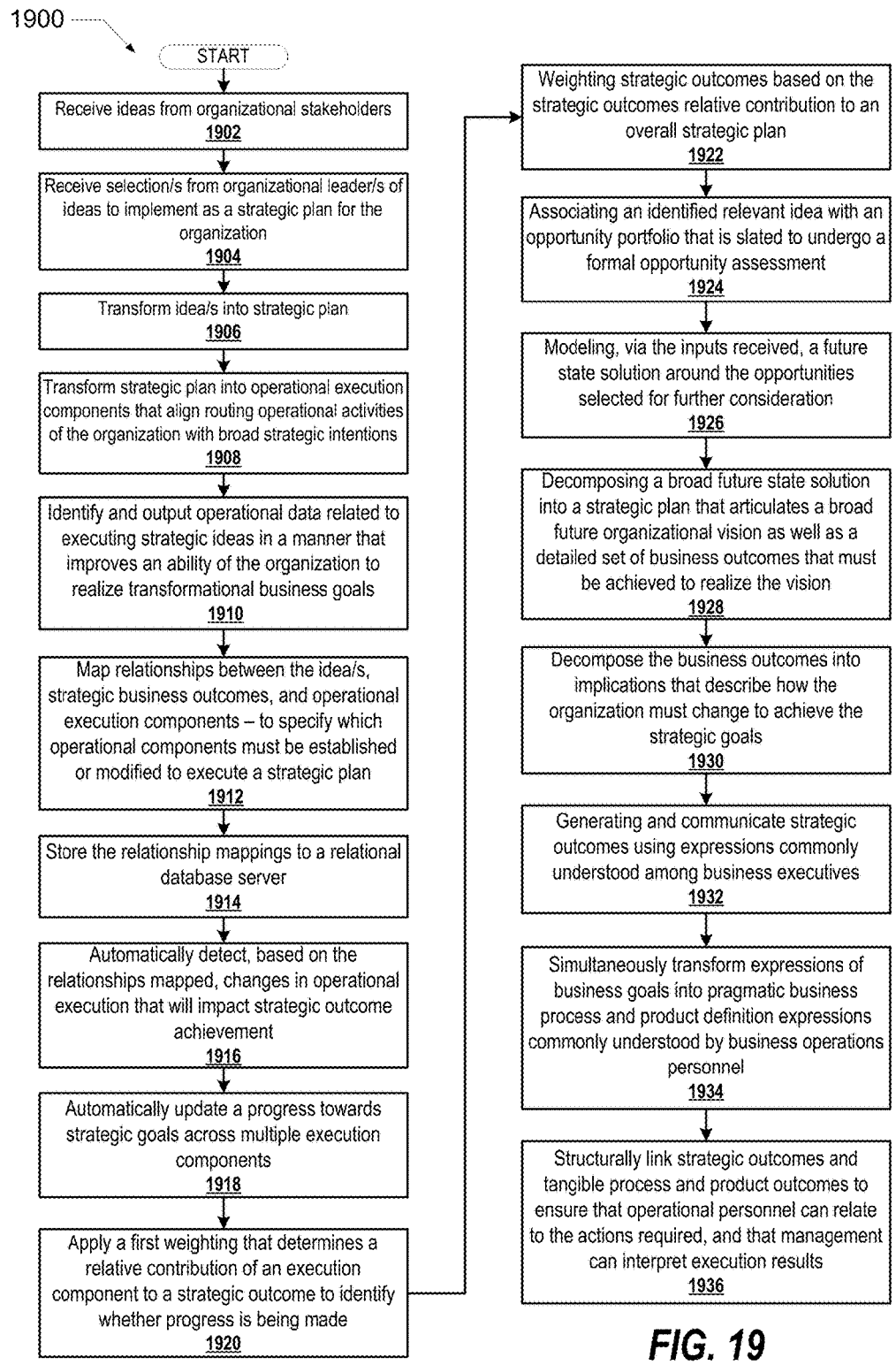
FIG. 19 is a flow chart illustrating the process flow within a method by which the active strategy management platform is implemented, according to one or more embodiments.

FIGS. 18 and 19 respectively provide a flow diagram and a flow chart, each illustrating the process flow of respective methods 1800 and 1900 for implementing the active strategy management technology platform 100. The various described high-level features of the methods 1800 and 1900 involve execution of specific code or program modules of the ASMP utility 2025 on a processor 2010 of a data processing system, such as illustrated by FIG. 20. Further, the user interface aspects of each method 1800, 1900 can involve one or more of the various user interfaces provided by FIGS. 2-17. With both methods 1800 and 1900, the platform 100 simultaneously enables integration of outcome-based top-down business analysis and bottom-up operational planning, wherein said platform comprises:

Method 1800 includes: capturing ideas (1810) from diverse, independent stakeholder groups in a manner that systematically structures transformation of ideas (1811) into targeted opportunities to improve an organization's business results, product offerings and internal business processes; analyzing opportunities (1812) to determine which opportunities offer the greatest potential gain; defining a strategic plan (1813) that transforms targeted business opportunities into a plurality of strategic outcomes including corporate business outcomes, business segment outcomes, business process outcomes, functional process outcomes, product outcomes and product feature outcome being managed distinctly by the organization defining the strategic plan, where the strategy realization planning (1814) establishes explicit linkages between the plurality of strategic outcomes including the business outcomes, process outcomes and product outcomes. Method 1800 provides the ability to facilitate alignment of a plurality of executive and operational personnel across a plurality of interdependent strategic outcomes and operational implications using an integrated software application interface and user experience made available as a software as a service (SaaS) model, executed by a computing system over a network. Method 1800 further includes: configuring a plurality of relationships between business outcomes, process outcomes and functional outcomes and enabling detailed definition and realization of the plurality of strategic outcomes through key assumptions, metrics, initiatives, business process improvements and product and/or service innovations; and providing a unified platform to monitor operational execution of strategic plans, including multiple organizational levels of managing strategy realization 1815, 1816, 1817, and enabling organizations to identify strategic and operational actions to assess (1818) whether minor or major strategic planning adjustments are required to ensure successful realization of a plurality of intended strategic outcomes.

FIG. 19 provides a second flow chart illustrating the computer-implemented method 1900 for implementing the functions of the ASMP. As with method 1800, method 1900 involves a processor 2010 executing instructions of an active strategy management platform (ASMP) module 100 to perform specific functions. As shown, method 1900 includes: receiving (1902) at least one idea from at least one organizational stakeholder; receiving (1904) a selection of one or more of the at least one ideas to implement as a strategic plan for a corresponding organization; transforming (1906), via the ASMP, the idea into at least one strategic plan of the corresponding organization; transforming (1908) the at least one strategic plan into a plurality of operational execution components that align routine operational activities of the organization with broad strategic intentions; and identifying and outputting (1910) operational data related to executing strategic ideas in a manner that improves an ability of the organization to realize transformational business goals. Method 1900 also includes mapping (1912), via the ASMP, relationships between the at least one idea, strategic business outcomes, and operational execution components, where relationship mappings generated specify which operational components must be established or modified to execute a strategic plan; storing (1914) the relationship mappings to a relational database server; automatically detecting (1916), based on the relationships mapped within the relational database, changes in operational execution that will impact strategic outcome achievement in order to enable an organizational leader to proactively make necessary course corrections to a strategic plan.

Additional, method 1900 includes: automatically updating (1918) a progress towards strategic goals across multiple execution components; applying (1920) a first weighting that determines a relative contribution of an execution component to a strategic outcome to identify whether progress is being made, wherein a result of the weighting is utilized to measure the progress; and weighting (1922) strategic outcomes based on the strategic outcome's relative contribution to an overall strategic plan. According to one embodiment, the organizational leader identifies which ideas of the at least one idea represents a relevant opportunity for business improvement. Also, method 1900 further includes: associating (1924) an identified relevant idea with an opportunity portfolio that is slated to undergo a formal opportunity assessment; modeling (1926), via the inputs received from the organizational leader, a future state solution around the opportunities selected for further consideration; decomposing (1928) a broad future state solution into a strategic plan that articulates a broad future organizational vision as well as a detailed set of business outcomes that represent goals the organization must achieve to realize the vision; and decomposing (1930) the business outcomes into implications that describe how the organization must change to achieve the strategic goals.

In one or more aspects, an implication contained within a strategic plan is expressed as an execution component that maps to specific operational activities required to realize the strategic goals, and the execution component and specific operational activities are defined in a manner that allows direct integration with external systems to enable the ASMP to generate automatic updates in response to operational execution events.

Additionally, method 1900 further includes: generating and communicating (1932) strategic outcomes using expressions commonly understood among business executives; simultaneously transforming (1934) expressions of business goals into pragmatic business process and product definition expressions commonly understood by business operations personnel; and structurally linking (1936) strategic outcomes and product outcomes to ensure that operational personnel can relate to the actions required, and that management can interpret execution results.

According to one or more additional aspects of method 1900, a selection of the idea to implement as a strategic plan is received via inputs provided during a session initiated for a user whose access login defines an organizational leader of the corresponding organization, where the ASMP defines roles and access features enabled for different users within the corresponding organization and only organizational leaders can make selections of ideas to implement as a strategic plan of the organization. Also, the ASMP provides a plurality of different user interface modules that enables receipt of different types of inputs and selections based on the institutional role of a logged-in user. Further, the plurality of operational execution components comprises business process definition and product/service definition. Additionally, the ASMP is accessible via one or more network-connected user devices over a distributed network and the ASMP is implemented as a software-as-a-service (SaaS) model.

In each of the flow charts above, one or more of the methods may be embodied in a computer readable medium containing computer readable code such that a series of steps are performed when the computer readable code is executed on a computing or data processing device. In some implementations, certain steps of the methods are combined, performed simultaneously or in a different order, or perhaps omitted, without deviating from the spirit and scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

As will be appreciated by one skilled in the art, aspects of the present disclosure may be embodied as a system, method or computer program product. Accordingly, aspects of the present disclosure may take the form of an entirely hardware embodiment or an embodiment combining software (including, for example, firmware, resident software, micro-code, etc.) and hardware aspects that may all generally be referred to herein as a "circuit," "module" or "system." Furthermore, aspects of the present disclosure may take the form of a computer program product embodied in one or more computer readable storage devices or other computer readable medium(s) having computer readable program code embodied thereon.

Any combination of one or more computer readable medium(s) may be utilized. The computer readable medium may be a computer readable signal medium or a computer readable storage device. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage device and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F., etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can configure a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the disclosure may be practiced by combining one or more machine-readable storage devices containing the code according to the present disclosure with appropriate processing hardware to execute the code contained therein. An apparatus for practicing the disclosure could be one or more processing devices and storage systems containing or having network access to program(s) coded in accordance with the disclosure.

Thus, it is important that while an illustrative embodiment of the present disclosure is described in the context of a fully functional computer (server) system with installed (or executed) software, those skilled in the art will appreciate that the software aspects of an illustrative embodiment of the present disclosure are capable of being distributed as a program product in a variety of forms, and that an illustrative embodiment of the present disclosure applies equally regardless of the particular type of media used to actually carry out the distribution.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While particular embodiments of the present disclosure have been shown and described, it will be obvious to those skilled in the art that, based upon the teachings herein, changes and modifications may be made without departing from this disclosure and its broader aspects. Consequently, the appended claims are to encompass within their scope all such changes and modifications as are within the true spirit and scope of this disclosure and embodiments of the disclosure are intended to be limited only by the scope of the appended claims, giving full cognizance to equivalents in all respects.

What is claimed is:

1. A computer-implemented method comprising:
a processor executing instructions of an active strategy management platform (ASMP) to perform the functions of:
receiving, via at least one network-connected user computer, at least one idea from at least one organizational stakeholder at the at least one network-connected user computer;
receiving a selection of one or more of the at least one ideas to implement as a strategic plan for a corresponding organization;
transforming, via the ASMP, the idea into at least one strategic plan of the corresponding organization, wherein the ASMP is accessible via one or more network-connected user computers over a distributed network;
transforming the at least one strategic plan into a plurality of operational execution components that align routine operational activities of the organization with broad strategic intentions;
identifying and outputting operational data related to executing strategic ideas in a manner that improves an ability of the organization to realize transformational business goals;
mapping, via the processor executing the ASMP, relationships between the at least one idea, strategic business outcomes, and operational execution components, wherein relationship mappings generated specify which operational components must be established or modified to execute a strategic plan;

storing the relationship mappings to a relational database server;

automatically detecting, via the processor executing the ASMP, based on the relationships mapped within the relational database, changes in operational execution that impact strategic outcome achievement;

outputting, on the output device of the data processing system, the changes in operational execution that impact strategic outcome achievement, in order to enable an organizational leader to proactively make necessary course corrections to a strategic plan; and outputting the strategic plan to a plurality of network-connected user computers associated with one or more individuals within the organization to spur action towards achieving the one of the outcomes, wherein the ASMP facilitates alignment, via respective ones of the plurality of network-connected user computers, of a plurality of executive and operational personnel, across a plurality of interdependent strategic outcomes and operational implications using an integrated software application interface and user experience made available as a software as a service (SaaS) model provided via the plurality of network-connected user computers.

2. The computer-implemented method of claim 1, further comprising automatically updating a progress towards strategic goals across multiple execution components;

determining a relative contribution of an execution component to a strategic outcome to identify whether progress is being made, wherein the determining is completed by applying a first weighting and a result of the weighting is utilized to measure the progress; and weighting strategic outcomes based on the strategic outcomes relative contribution to an overall strategic plan.

3. The computer-implemented method of claim 1, wherein the organizational leader identifies which ideas of the at least one idea represents a relevant opportunity for business improvement, and the method further comprises:

associating an identified relevant idea with an opportunity portfolio that is slated to undergo a formal opportunity assessment;

modeling, via the inputs received from the organizational leader, a future state solution around the opportunities selected for further consideration;

decomposing a broad future state solution into a strategic plan that articulates a broad future organizational vision as well as a detailed set of business outcomes that represent goals the organization must achieve to realize the vision; and decomposing the business outcomes into implications that describe how the organization must change to achieve the strategic goals.

4. The computer-implemented method of claim 3, wherein an implication contained within a strategic plan is expressed as an execution component that maps to specific operational activities required to realize the strategic goals, and wherein the execution component and specific operational activities are defined in a manner that allows direct integration with external systems to enable the ASMP to generate automatic updates in response to operational execution events.

5. The computer-implemented method of claim 1, further comprising:

generating and communicating strategic outcomes using expressions commonly understood among business executives;

simultaneously transforming expressions of business goals into pragmatic business process and product definition expressions commonly understood by business operations personnel; and structurally linking strategic outcomes and tangible process and product outcomes to ensure that operational personnel can relate to the actions required, and that management can interpret execution results.

6. The computer-implemented method of claim 1, wherein a selection of the idea to implement as a strategic plan is received via inputs provided during a session initiated at one of the plurality of network-connected user computers for a user whose access login defines an organizational leader of the corresponding organization, wherein the ASMP defines roles and access features enabled for different users within the corresponding organization and only organizational leaders can make selections of ideas to implement as a strategic plan of the organization.

7. The computer-implemented method of claim 6, wherein the ASMP provides a plurality of different user interface modules, presented at the plurality of network-connected user computers, that enables receipt of different types of inputs and selections based on the institutional role of a logged-in user.

8. The computer-implemented method of claim 1, wherein the plurality of operational execution components comprises business process definition and product/service definition.

9. The computer-implemented method of claim 1, wherein the ASMP is implemented as a software-as-a-service (SaaS) model, and the method further comprises:

providing, via a series of inter-linked user interface modules presented on the plurality of network-connected user computers, a unified platform to monitor operational execution of strategic plans, wherein the platform enables the organization to take identified strategic and operational actions to assess whether minor or major strategic planning adjustments are required to ensure successful realization of a plurality of intended strategic outcomes.

10. A data processing system comprising:

at least one processor;

at least one input device and at least one output device communicatively coupled to the at last one processor;

a network interface device supporting connection to one or more second computing devices via a linking network;

an active strategy management platform (ASMP) utility that executes on the at least one processor and configures the data processing system to:

receive, from at least one computing device of the one or more second computing devices via one or more of the at least one input device and the network interface device, at least one idea from at least one organizational stakeholder at the at least one computing device;

receive a selection of one or more of the at least one idea to implement as a strategic plan for a corresponding organization;

transform, via the processor executing the ASMP utility, the idea into at least one strategic plan of the corresponding organization, wherein the ASMP is accessible via one or more network-connected user computers over a distributed network;

transform, via processor executing the ASMP utility, the at least one strategic plan into a plurality of operational execution components that align routine operational activities of the organization with broad strategic intentions;

identify and output operational data related to executing strategic ideas in a manner that improves an ability of the organization to realize transformational business goals;

map, via processor executing the ASMP utility, relationships between the at least one idea, strategic business outcomes, and operational execution components, wherein relationship mappings generated specify which operational components must be established or modified to execute a strategic plan;

store the relationship mappings to a relational database server;

automatically detect, via the processor executing the ASMP utility, based on the relationships mapped within the relational database, changes in operational execution that will impact strategic outcome achievement;

output, on one or more of the at least one output device, the changes in operational execution that impact strategic outcome achievement, in order to enable an organizational leader to proactively make necessary course corrections to a strategic plan; and output the strategic plan to a plurality of the second computing devices associated with one or more individuals within the organization to spur action towards achieving the one of the outcomes, wherein the ASMP facilitates alignment, via respective ones of the plurality of second computing devices, of a plurality of executive and operational personnel, across a plurality of interdependent strategic outcomes and operational implications using an integrated software application interface and user experience made available as a software as a service (SaaS) model provided via the plurality of second computing devices.

11. The data processing system of claim 10, where execution of the ASMP utility further configures the data processing system to:

automatically update a progress towards strategic goals across multiple execution components;

apply a first weighting that determines a relative contribution of an execution component to a strategic outcome to identify whether progress is being made, wherein a result of the weighting is utilized to measure the progress; and weight strategic outcomes based on the strategic outcomes relative contribution to an overall strategic plan.

12. The data processing system of claim 10, wherein:

a selection of the idea to implement as a strategic plan is received via inputs provided during a session initiated for a user whose access login defines an organizational leader of the corresponding organization, wherein the ASMP defines roles and access features enabled for different users within the corresponding organization and organizational leaders can make selections of ideas to implement as a strategic plan of the organization;

the organizational leader identifies which ideas of the at least one idea represents a relevant opportunity for business improvement; and execution of the ASMP utility further configures the data processing system to:

associate an identified relevant idea with an opportunity portfolio that is slated to undergo a formal opportunity assessment;

model, via the inputs received from the organizational leader, a future state solution around the opportunities selected for further consideration;

decompose a broad future state solution into a strategic plan that articulates a broad future organizational vision as well as a detailed set of business outcomes that represent goals the organization must achieve to realize the vision; and decompose the business outcomes into implications that describe how the organization must change to achieve the strategic goals.

13. The data processing system of claim 12, wherein an implication contained within a strategic plan is expressed as an execution component that maps to specific operational activities required to realize the strategic goals, and wherein the execution component and specific operational activities are defined in a manner that allows direct integration with external systems to enable the ASMP to generate automatic updates in response to operational execution events.

14. The data processing system comprising of claim 10, where execution of the ASMP utility further configures the data processing system to:

generate and communicate strategic outcomes using expressions commonly understood among business executives;

simultaneously transform expressions of business goals into pragmatic business process and product definition expressions commonly understood by business operations personnel; and structurally link strategic outcomes and tangible process and product outcomes to ensure that operational personnel can relate to the actions required, and that management can interpret execution results.

15. The data processing system of claim 10, wherein the ASMP utility further configures the processor to enable the data processing system to:

generate a user interface of an application screen having a plurality of menus, the application screen presenting areas for idea submission and idea editing, the plurality of menus enabling a stakeholder to navigate to an application screen to input an idea, a description of the idea, and reference items that support the description;

provide, via a series of inter-linked user interface modules presented on the plurality of second computing devices, a unified platform to monitor operational execution of strategic plans, wherein the platform enables the organization to take identified strategic and operational actions to assess whether minor or major strategic planning adjustments are required to ensure successful realization of a plurality of intended strategic outcomes; and update the relational database with new idea submission and changes to an existing idea in response to a save request received from within the user interface.

16. A computer program product comprising a tangible computer readable storage device and program code stored on the computer readable storage device that when executed on a data processing device configures the data processing device to perform the processes of:

receiving, via at least one network-connected user computer, at least one idea from at least one organizational stakeholder at the at least one network-connected user computer;

receiving a selection of one or more of the at least one ideas to implement as a strategic plan for a corresponding organization;

transforming, via the ASMP, the idea into at least one strategic plan of the corresponding organization, wherein the ASMP is accessible via one or more network-connected user computers over a distributed network;
transforming the at least one strategic plan into a plurality of operational execution components that align routine operational activities of the organization with broad strategic intentions;
identifying and outputting operational data related to executing strategic ideas in a manner that improves an ability of the organization to realize transformational business goals;
mapping, via the processor executing the ASMP, relationships between the at least one idea, strategic business outcomes, and operational execution components, wherein relationship mappings generated specify which operational components must be established or modified to execute a strategic plan;
storing the relationship mappings to a relational database server;
automatically detecting, via the processor executing the ASMP, based on the relationships mapped within the relational database, changes in operational execution that impact strategic outcome achievement;
outputting, on the output device of the data processing system, the changes in operational execution that impact strategic outcome achievement, in order to enable an organizational leader to proactively make necessary course corrections to a strategic plan;
outputting the strategic plan to a plurality of network-connected user computers associated with one or more individuals within the organization to spur action towards achieving the one of the outcomes, wherein the ASMP facilitates alignment, via respective ones of the plurality of network-connected user computers, of a plurality of executive and operational personnel, across a plurality of interdependent strategic outcomes and operational implications using an integrated software application interface and user experience made available as a software as a service (SaaS) model provided via the plurality of network-connected user computers; and
providing, via a series of inter-linked user interface modules presented on the plurality of network-connected user computers, a unified platform to monitor operational execution of strategic plans, wherein the platform enables the organization to take identified strategic and operational actions to assess whether minor or major strategic planning adjustments are required to ensure successful realization of a plurality of intended strategic outcomes.

* * * * *